US010597106B2

(12) United States Patent
Takeshita et al.

(10) Patent No.: US 10,597,106 B2
(45) Date of Patent: Mar. 24, 2020

(54) BICYCLE DISPLAY DEVICE

(71) Applicant: Shimano Inc., Sakai, Osaka (JP)

(72) Inventors: Hiroaki Takeshita, Osaka (JP); Yuichiro Ishikawa, Osaka (JP); Takashi Komemushi, Osaka (JP); Kazuhiro Fujii, Osaka (JP); Satoshi Shahana, Osaka (JP); Hiroyuki Miyoshi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/837,615

(22) Filed: Dec. 11, 2017

(65) Prior Publication Data
US 2018/0178870 A1  Jun. 28, 2018

(30) Foreign Application Priority Data
Dec. 22, 2016 (JP) .................. 2016-250101

(51) Int. Cl.
| B62M 1/00 | (2010.01) |
| G09G 5/00 | (2006.01) |
| B62J 99/00 | (2020.01) |
| B62M 6/40 | (2010.01) |
| G06F 3/147 | (2006.01) |

(Continued)

(52) U.S. Cl.
CPC ............... *B62J 99/00* (2013.01); *B62M 6/40* (2013.01); *B62M 6/55* (2013.01); *G06F 3/147* (2013.01); *G09G 5/006* (2013.01); *B62J 2099/002* (2013.01); *B62J 2099/0026* (2013.01); *B62M 25/08* (2013.01); *G09G 5/00* (2013.01);

(Continued)

(58) Field of Classification Search
CPC .................................................. B60W 30/182
See application file for complete search history.

(56) References Cited

U.S. PATENT DOCUMENTS 5,625,336 A * 4/1997 Yamamoto ............... B62J 99/00
340/309.16
5,676,021 A * 10/1997 Campagnolo .......... B62K 23/06
116/28.1

(Continued)

FOREIGN PATENT DOCUMENTS

| CN | 1395642 A | 2/2003 |
| CN | 101285880 A | 10/2008 |

(Continued)

*Primary Examiner* — Phong X Nguyen
(74) *Attorney, Agent, or Firm* — Global IP Counselors, LLP

(57) ABSTRACT

A bicycle display device is configured to show an image on a display that is appropriate to a bicycle component, which is communicable with the bicycle display device. The bicycle display device is configured to be mounted on a bicycle. The bicycle display device includes a communication unit, a display and an electronic controller. The communication unit is communicably connected to a bicycle component that is mounted on the bicycle and configured to be actuated in multiple actuation modes. The display is configured to show an image related to the actuation modes of the bicycle component, which is one of different types of bicycle components. The electronic controller changes the image shown on the display in accordance with the type of the bicycle component communicably connected to the communication unit.

18 Claims, 11 Drawing Sheets

(51) Int. Cl.
*B62M 6/55* (2010.01)
*B62M 25/08* (2006.01)
*G09G 5/14* (2006.01)

(52) U.S. Cl.
CPC .......... *G09G 5/14* (2013.01); *G09G 2340/04* (2013.01); *G09G 2340/145* (2013.01); *G09G 2370/16* (2013.01)

(56) References Cited

U.S. PATENT DOCUMENTS

| | | | | |
|---|---|---|---|---|
| 6,084,506 | A * | 7/2000 | Irie | B62J 99/00 340/432 |
| 6,204,752 | B1 * | 3/2001 | Kishimoto | B62J 99/00 340/432 |
| 6,216,060 | B1 * | 4/2001 | Kishimoto | B62J 99/00 340/427 |
| 8,330,671 | B2 * | 12/2012 | Ryu | G09G 5/005 345/1.3 |
| 8,356,279 | B2 * | 1/2013 | Shogaki | G06F 3/1204 717/115 |
| 2003/0160686 | A1 * | 8/2003 | Uno | B62J 99/00 340/432 |
| 2005/0253820 | A1 * | 11/2005 | Horiuchi | B62J 99/00 345/173 |
| 2007/0068332 | A1 | 3/2007 | Fujii et al. | |
| 2007/0120763 | A1 * | 5/2007 | De Paepe | G06F 3/03547 345/1.3 |
| 2009/0027405 | A1 * | 1/2009 | Kaga | G09G 5/006 345/520 |
| 2009/0268093 | A1 * | 10/2009 | Ishihara | H04N 7/18 348/564 |
| 2009/0298545 | A1 * | 12/2009 | Kittel | G06F 3/0481 455/566 |
| 2010/0306702 | A1 * | 12/2010 | Warner | G06F 3/0482 715/811 |
| 2011/0304288 | A1 | 12/2011 | Saida | |
| 2012/0109511 | A1 * | 5/2012 | Swisher | A63B 24/0062 701/409 |
| 2013/0044111 | A1 * | 2/2013 | VanGilder | A61B 5/044 345/440 |
| 2013/0145279 | A1 * | 6/2013 | Ricci | G01C 21/20 715/746 |
| 2015/0239454 | A1 * | 8/2015 | Sujan | F02D 41/1401 701/54 |
| 2015/0279328 | A1 * | 10/2015 | Ong | G09G 5/14 345/660 |
| 2015/0329161 | A1 * | 11/2015 | Fujii | B62M 9/122 701/64 |
| 2016/0229405 | A1 * | 8/2016 | Shimizu | B60W 30/182 |
| 2016/0248964 | A1 * | 8/2016 | Okamoto | G03B 17/561 |
| 2016/0311415 | A1 | 10/2016 | Oshima et al. | |
| 2017/0237931 | A1 * | 8/2017 | Lee | G06F 3/0346 348/565 |

FOREIGN PATENT DOCUMENTS

| | | |
|---|---|---|
| CN | 103003088 A | 3/2013 |
| JP | 11-23330 A | 1/1999 |
| JP | 2007-84031 A | 4/2007 |
| JP | 4427485 B | 3/2010 |
| JP | 2011-259682 A | 12/2011 |
| JP | 2016-101865 A | 6/2016 |
| WO | 2015/104817 A1 | 7/2015 |

* cited by examiner

BICYCLE DISPLAY DEVICE

CROSS-REFERENCE TO RELATED APPLICATIONS

This application claims priority to Japanese Patent Application No. 2016-250101, filed on Dec. 22, 2016. The entire disclosure of Japanese Patent Application No. 2016-250101 is hereby incorporated herein by reference.

BACKGROUND

Field of the Invention

The present invention generally relates to a bicycle display device.

Background Information

Japanese Laid-Open Patent Publication No. 2016-101865 (hereinafter referred to as Patent document 1) describes a bicycle display device that includes a display that shows information transmitted from a bicycle component that is communicable with the bicycle display device.

SUMMARY

It has been discovered that the above bicycle display device of Patent document 1 does not take into consideration the replacement and addition of a bicycle component mounted on a bicycle. Thus, there is room for improvement in presentation of the display.

One object of the present invention is to provide a bicycle display device configured to show an image that is appropriate to a bicycle component, which is communicable with the bicycle display device, on a display.

In accordance with a first aspect of the present invention, a bicycle display device is configured to be mounted on a bicycle. The bicycle display device includes a communication unit, a display and an electronic controller. The communication unit is communicably connected to a bicycle component that is mounted on the bicycle and configured to be actuated in multiple actuation modes. The display is configured to show an image related to the actuation modes of the bicycle component, which is one of different types of bicycle components. The electronic controller changes the image shown on the display in accordance with the type of the bicycle component communicably connected to the communication unit. With the bicycle display device according to the first aspect, the display shows an image that is appropriate to a bicycle component communicable with the bicycle display device.

In accordance with a second aspect of the present invention, the bicycle display device according to the first aspect is configured so that the different types of the bicycle components include a first bicycle component and a second bicycle component. The electronic controller is configured to show the image corresponding to the actuation modes of the first bicycle component on the display upon determining the communication unit is communicably connected to the first bicycle component and communicably disconnected from the second bicycle component. The electronic controller shows the image corresponding to the actuation modes of the second bicycle component on the display upon determining the communication unit is communicably connected to the second bicycle component and communicably disconnected from the first bicycle component. With the bicycle display device according to the second aspect, the display shows an image that is appropriate to one of the first bicycle component and the second bicycle component in accordance with the communication state with the first bicycle component and the second bicycle component.

In accordance with a third aspect of the present invention, the bicycle display device according to the second aspect is configured so that the first bicycle component includes a first motor that assists propulsion of the bicycle. The second bicycle component includes a second motor that assists propulsion of the bicycle. The multiple actuation modes of the first bicycle component differ from each other in an output state of the first motor. The multiple actuation modes of the second bicycle component differ from each other in an output state of the first motor. With the bicycle display device according to the third aspect, the display selectively shows an image appropriate to the actuation mode related to the assist of the first motor of the first bicycle component and an image appropriate to the actuation mode related to the assist of the second motor of the second bicycle component.

In accordance with a fourth aspect of the present invention, the bicycle display device according to the second aspect is configured so that the first bicycle component is configured to control a first shifting device of the bicycle. The second bicycle component is configured to control a second shifting device of the bicycle. The multiple actuation modes of the first bicycle component include a mode in which a setting of the first shifting device is changeable and a mode in which the first shifting device performs a shifting action in accordance with an operation of an operating device. The multiple actuation modes of the second bicycle component include a mode in which a setting of the second shifting device is changeable and a mode in which the second shifting device performs a shifting action in accordance with an operation of the operating device. With the bicycle display device according to the fourth aspect, the display selectively shows an image appropriate to the first bicycle component, which controls the first shifting device, and an image appropriate to the second bicycle component, which controls the second shifting device.

In accordance with a fifth aspect of the present invention, a bicycle display device is configured to be mounted on a bicycle. The bicycle display device includes a communication unit, a display and an electronic controller. The communication unit is communicably connected to a bicycle component that is mounted on the bicycle. The display is configured to show a setting menu screen that contains a plurality of images related to items settable in correspondence with the bicycle component. The electronic controller changes a portion of the setting menu screen and displays the setting menu screen in accordance with a type of the bicycle component communicably connected to the communication unit. With the bicycle display device according to the fifth aspect, the display shows a setting menu screen that is appropriate to a bicycle component communicable with the bicycle display device.

In accordance with a sixth aspect of the present invention, the bicycle display device according to the fifth aspect is configured so that the electronic controller is configured to control the display so as not to show the image related to the item that is not settable upon determining an item corresponding to one of the images contained in the setting menu screen is not settable for the bicycle component communicably connected to the communication unit. With the bicycle display device according to the sixth aspect, the setting menu screen does not contain an image related to an item inappropriate to a bicycle component communicable with the bicycle display device.

In accordance with a seventh aspect of the present invention, the bicycle display device according to the sixth aspect is configured so that the items are related to an action of a shifting device mounted on the bicycle. With the bicycle display device according to the seventh aspect, the operability of the shifting device operated by the user is improved.

In accordance with an eighth aspect of the present invention, the bicycle display device according to the seventh aspect is configured so that the items are related to a process for controlling the shifting device to change a transmission ratio of the bicycle. With the bicycle display device according to the eighth aspect, the operability of the user to change the process for controlling the shifting device is improved.

In accordance with a ninth aspect of the present invention, a bicycle display device is configured to be mounted on a bicycle. The bicycle display device includes a communication unit, a display and an electronic controller. The communication unit is communicably connected to an electronic device that is mounted on the bicycle or carried by a rider of the bicycle. The display is configured to show an image related to the electronic device in each of a plurality of display regions contained in one screen. The electronic controller changes a size of at least one of the plurality of display regions in accordance with the electronic device communicably connected to the communication unit. With the bicycle display device according to the ninth aspect, enlargement of a display region allows the user to recognize the image shown on the display region. Also, miniaturization of the display region allows the user to recognize images shown on other display regions.

In accordance with a tenth aspect of the present invention, the bicycle display device according to the ninth aspect is configured so that the electronic device includes at least one of a bicycle component mounted on the bicycle and a sensor carried by the rider. With the bicycle display device according to the tenth aspect, the display shows a presentation appropriate to the bicycle component mounted on the bicycle and the sensor carried by the rider.

In accordance with an eleventh aspect of the present invention, the bicycle display device according to the tenth aspect is configured so that the display is configured to show the image related to one of speed of the bicycle, a battery level, time, a state of a lamp, an actuation mode of the bicycle component, a heart rate, blood pressure, and cadence in each of the plurality of display regions. With the bicycle display device according to the eleventh aspect, an image related to one of the bicycle speed, the battery level, the time, the lamp state, the actuation mode of the bicycle component, the heart rate, the blood pressure, and the cadence can be enlarged or miniaturized.

In accordance with a twelfth aspect of the present invention, the bicycle display device according to any one of the ninth to eleventh aspects is configured so that the electronic controller is configured to change sizes of the display regions in accordance with predetermined priority order given to the images related to the electronic device. With the bicycle display device according to the twelfth aspect, priority can be given to the enlargement of an image related to an electronic device that needs to be recognized by the user. Additionally, priority can be given to the miniaturization of an image related to an electronic device of which need for recognition by the user is small.

In accordance with a thirteenth aspect of the present invention, the bicycle display device according to the twelfth aspect is configured so that the electronic controller is configured to change the predetermined priority order. With the bicycle display device according to the thirteenth aspect, priority is given to the enlargement or miniaturization of an image related to an electronic device in accordance with desired priority.

In accordance with a fourteenth aspect of the present invention, the bicycle display device according to any one of the first to thirteenth aspects further includes a memory device that stores information used to show the image on the display. With the bicycle display device according to the fourteenth aspect, even if information of an image is not received from a bicycle component or an electronic device, the content shown on the display can be changed to a presentation appropriate to a bicycle component communicable with the bicycle display device.

In accordance with a fifteenth aspect of the present invention, the bicycle display device according to any one of the first to eighth aspects and the tenth to fourteenth aspects is configured so that the communication unit includes at least one of a communication port communicable with the bicycle component through wire connection and a wireless communication module communicable with the bicycle component through wireless connection. With the bicycle display device according to the fifteenth aspect, the bicycle display device is connectable to a bicycle component so as to perform wired and wireless communication with the bicycle component.

In accordance with a sixteenth aspect of the present invention, the bicycle display device according to any one of the first to fifteenth aspects is configured so that the image includes a character. With the bicycle display device according to the sixteenth aspect, the use of a character allows the user to correctly recognize information shown on the display.

In accordance with a seventeenth aspect of the present invention, the bicycle display device according to any one of the first to sixteenth aspects is configured so that the image includes an icon. With the bicycle display device according to the seventeenth aspect, the use of an icon facilitates the visual recognition of the user.

Accordingly, the bicycle display device is configured to show a presentation appropriate to a bicycle component, which is communicable with the bicycle display device, on the display.

BRIEF DESCRIPTION OF THE DRAWINGS

Referring now to the attached drawings which form a part of this original disclosure.

DETAILED DESCRIPTION OF EMBODIMENTS

The following description illustrates various embodiments and is not intended to be restrictive. The embodiments can be modified. Further, two or more of the embodiments can be combined.

First Embodiment

Figure 1:
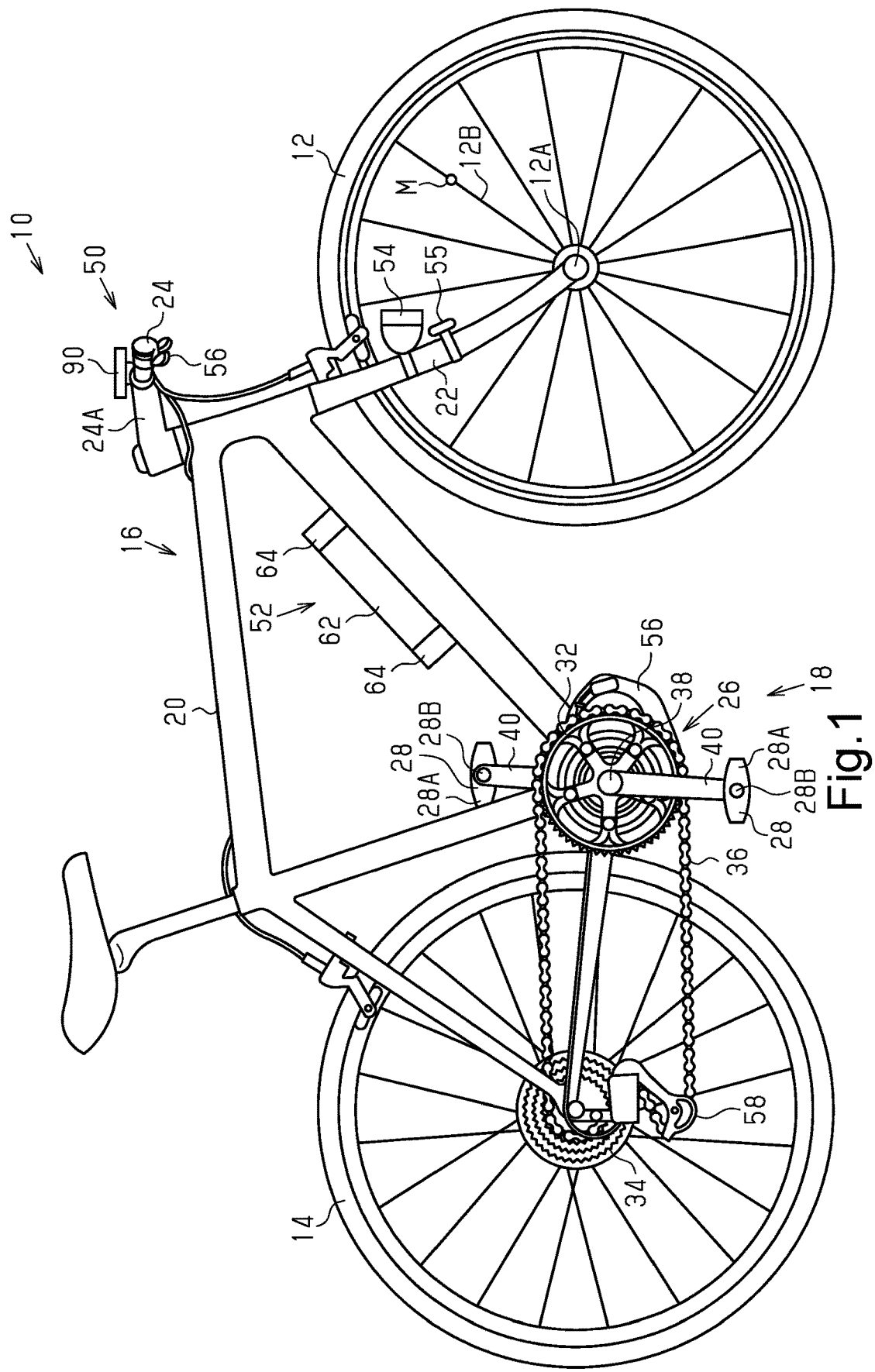
FIG. 1 is a side elevational view of a bicycle that includes a first embodiment of a bicycle display device.

A bicycle that includes a first embodiment of a bicycle display device will now be described with reference to FIGS. 1 to 13. As shown in FIG. 1, a bicycle 10 includes a front wheel 12, a rear wheel 14, a bicycle main body 16, a driving mechanism 18, and a bicycle electronic system 50. The bicycle main body 16 includes a frame 20, a front fork 22 connected to the frame 20, and a handlebar 24 connected to the front fork 22 by a stem 24A so that the handlebar 24 is attachable to and removable from the front fork 22. The front fork 22 is supported by the frame 20 and connected to an axle 12A of the front wheel 12.

The bicycle 10 travels as a result of transmission of manual (human or muscular) power to the rear wheel 14 via the driving mechanism 18. The driving mechanism 18 includes a crank 26, two pedals 28, a front rotation body 32, a rear rotation body 34, and a chain 36.

The crank 26 includes a crankshaft 38 and two crank arms 40. The crankshaft 38 is rotatably supported by a housing of a bicycle component 56 that is coupled to the frame 20. The two crank arms 40 are coupled to the crankshaft 38. Each of the two pedals 28 includes a pedal body 28A and a pedal shaft 28B. The pedal shafts 28B are respectively coupled to the crank arms 40. The pedal bodies 28A are rotatably supported by the pedal shafts 28B, respectively.

The front rotation body 32 is directly or indirectly coupled to the crankshaft 38. The front rotation body 32 is coaxial with the crankshaft 38. The rear wheel 14 includes a hub (not shown). In one example, the front rotation body 32 includes a front sprocket, and the rear rotation body 34 includes a rear sprocket. The chain 36 runs around the front rotation body 32 and the rear rotation body 34. In a case in which manual (human or muscular) power applied to the pedals 28 rotates the crank 26 in one direction, the rear wheel 14 is also rotated in one direction by the front rotation body 32, the chain 36, and the rear rotation body 34.

Figure 2:
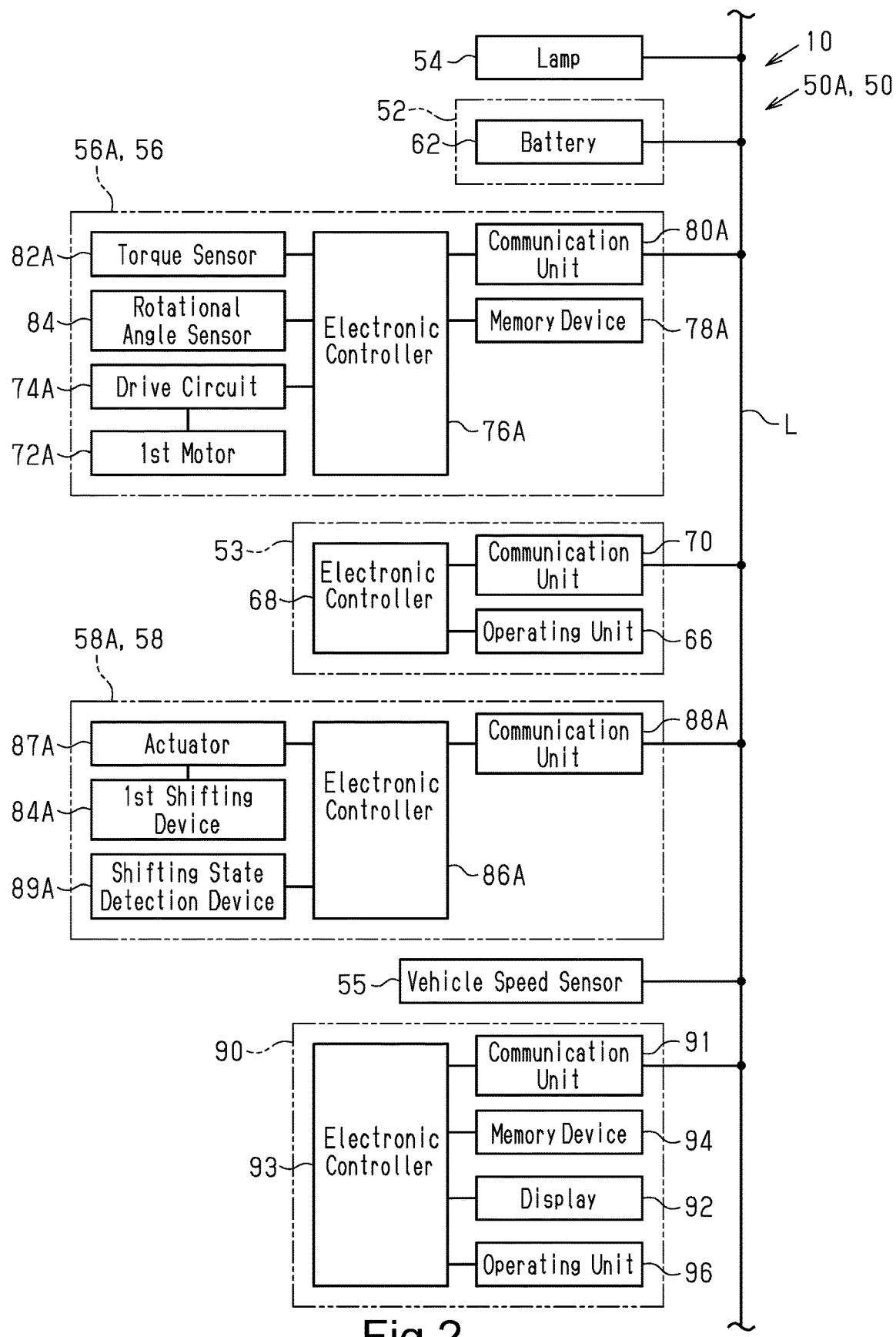
FIG. 2 is a block diagram showing the electrical configuration of a first bicycle electronic system configured to be mounted on the bicycle of FIG. 1.
Figure 3:
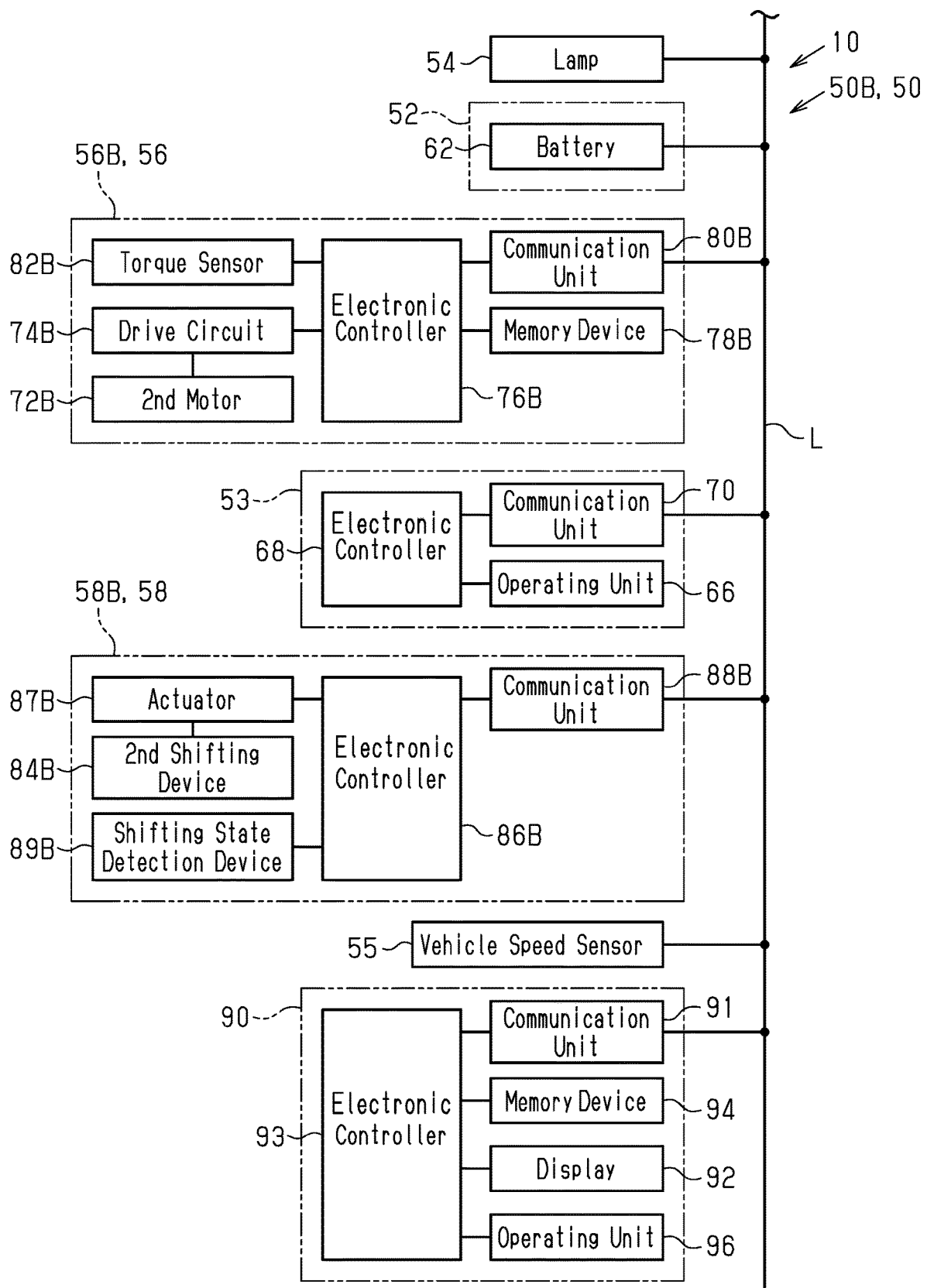
FIG. 3 is a block diagram showing the electrical configuration of a second bicycle electronic system configured to be mounted on the bicycle of FIG. 1.

As shown in FIGS. 2 and 3, each of bicycle electronic systems 50 includes a battery unit 52, an operating device 53, a lamp 54, a vehicle speed sensor 55, the bicycle component 56, a shifting apparatus 58, and a bicycle display device 90. The battery unit 52, the operating device 53, the lamp 54, the vehicle speed sensor 55, the bicycle component 56, the shifting apparatus 58, and the bicycle display device 90 are mounted on the bicycle 10. The bicycle component 56 is configured to be actuated in multiple actuation modes. The devices of the bicycle electronic system 50 are connected to one another so as to perform, for example, power line communication (PLC) using a power communication line L. In another example, the devices of the bicycle electronic system 50 are connected to one another so as to perform wireless communication. Examples of wireless communication methods include BLUETOOTH (registered trademark) and ANT+(registered trademark). Further, while some of the devices included in the bicycle electronic system 50 are connected by wires to the bicycle electronic system 50, others can be connected to the bicycle electronic system 50 through wireless communication. Those devices included in the bicycle electronic system 50 that are connected to the battery unit 52 by the power communication line L are supplied with power from the battery unit 52. Those devices included in the bicycle electronic system 50 that are not connected to the battery unit 52 by the power communication line L are supplied with power from a power supply source that differs from the battery unit 52 such as a battery.

The bicycle electronic system 50 can selectively include one of bicycle components 56 of different types and one of shifting apparatuses 58 of different types. The bicycle components 56 of different types include a first bicycle component 56A and a second bicycle component 56B. The shifting apparatuses 58 include a first shifting apparatus 58A, which is configured to be combined with the first bicycle component 56A, and a second shifting apparatus 58B, which is configured to be combined with the second bicycle component 56B. The first bicycle component 56A is, for example, a drive unit for a mountain bike. The second bicycle component 56B is, for example, a drive unit for a road bike or for city cycling.

As shown in FIG. 2, the battery unit 52, the operating device 53, the first bicycle component 56A, the first shifting apparatus 58A, and the bicycle display device 90 are communicably connected to one another. This configures a first bicycle electronic system 50A.

As shown in FIG. 3, the battery unit 52, the operating device 53, the second bicycle component 56B, the second shifting apparatus 58B, and the bicycle display device 90 are communicably connected to one another. This arrangement forms a second bicycle electronic system 50B.

As shown in FIG. 1, the battery unit 52 includes a battery 62 and a battery holder 64, which attaches the battery 62 to the frame 20 so that the battery 62 is attachable to and removable from the frame 20. The battery 62 includes one or more rechargeable battery cells. The battery 62 supplies power to each device of the bicycle electronic system 50 that is electrically connected to the battery 62 by wire.

Figure 4:
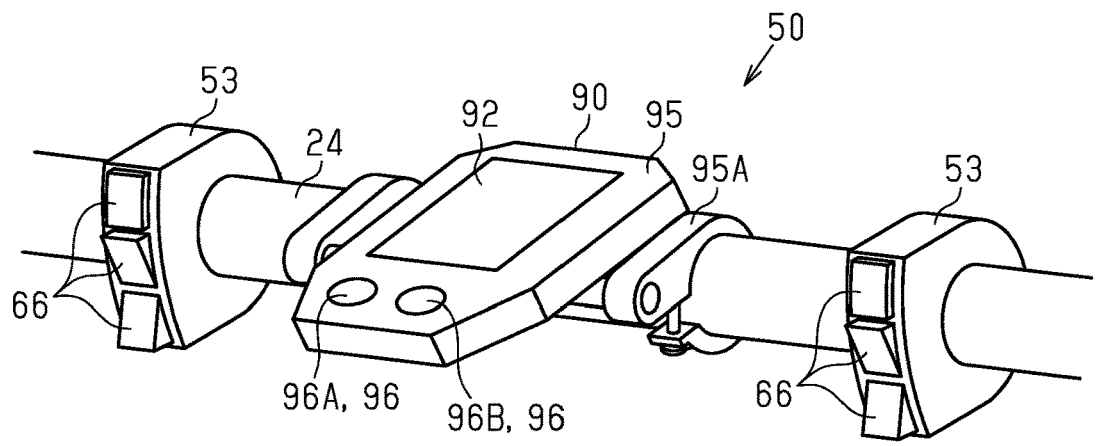
FIG. 4 is a perspective view showing a portion of a handlebar to which the bicycle display device of FIG. 1 is coupled.

As shown in FIG. 4, the operating devices 53 are coupled to the handlebar 24. The operating devices 53 are configured to be operable by the user. The operating devices 53 are respectively coupled to the right side and left side of the handlebar 24. As shown in FIG. 2, the operating device 53 includes an operating unit 66, an electronic controller 68, and a communication unit 70. The operating device 53 includes a plurality of operating units 66. In one example, the operating units 66 are buttons. In a case in which the operating units 66 are operated, the electronic controller 68 outputs an operation signal corresponding to the operated one of the operating units 66 from the communication unit 70. The communication unit 70 can also be considered to be a wired or wireless communicator.

As shown in FIG. 1, the lamp 54 is coupled to the front fork 22. The lamp 54 is switched between an illuminated state and an unilluminated state by operation of a second button 96B of the display device 90.

The vehicle speed sensor 55 is coupled to the front fork 22 shown in FIG. 1. The vehicle speed sensor 55 outputs a value corresponding to a change in the position relative to a magnet M coupled to one of spokes 12B of the front wheel 12. It is preferred that the vehicle speed sensor 55 include a magnetic reed forming a reed switch or a Hall sensor.

As shown in FIG. 2, the first bicycle component 56A includes a first motor 72A. The first bicycle component 56A further includes a drive circuit 74A, a electronic controller 76A, a communication unit 80A, a memory device 78A, a torque sensor 82A, and a rotational angle sensor 84.

The first motor 72A assists propulsion of the bicycle 10. The first motor 72A includes an electric motor. The drive circuit 74A controls the power supplied from the battery 62 to the first motor 72A. The first motor 72A is located in a power transmission path extending from the pedals 28 to the rear wheel 14 or to transmit rotation to the front wheel 12. The first motor 72A is located on the frame 20 of the bicycle 10, the rear wheel 14, or the front wheel 12. In one example, the first motor 72A is connected to the power transmission path extending from the crankshaft 38 to the front rotation body 32. It is preferred that a first one-way clutch (not shown) be located in the power transmission path extending between the first motor 72A and the crankshaft 38 so that if the crankshaft 38 is rotated in a direction in which the bicycle 10 moves forward, then the rotation force of the crank 26 will not rotate the first motor 72A. The first bicycle component 56A can include a speed reduction mechanism that reduces the speed of rotation of the first motor 72A and outputs the rotation. It is preferred that a second one-way clutch (not shown) be located in the power transmission path extending between the crankshaft 38 and the front rotation body 32 so that if the crankshaft 38 is rotated in a direction opposite to the direction in which the bicycle 10 moves forward, then the rotation force of the crank 26 will not rotate the front rotation body 32.

The electronic controller 76A includes an arithmetic processing unit that executes predetermined control programs. The arithmetic processing unit includes, for example, a central processing unit (CPU) or a micro processing unit (MPU). The electronic controller 76A can include one or more arithmetic processing units. The memory device 78A stores information used for various kinds of control programs and various kinds of control processes. The memory device 78A includes, for example, a nonvolatile memory and a volatile memory and can includes a ROM (Read Only Memory) device, a RAM (Random Access Memory) device, a hard disk, a flash drive, etc. The memory device 78A is any computer storage device or any computer readable medium with the sole exception of a transitory, propagating signal. The communication unit 80A is configured to communicate with other devices of the bicycle electronic system 50. The communication unit 80A can also be considered to be a wired or wireless communicator.

The torque sensor 82A outputs a signal corresponding to manual (human or muscular) power. The torque sensor 82A detects manual (human or muscular) power applied to the crankshaft 38. The torque sensor 82A can be located between the crankshaft 38 and the front rotation body 32. Alternatively, the torque sensor 82A can be located on the crankshaft 38 or the front rotation body 32. Alternatively, the torque sensor 82A can be located on one of the crank arms 40 and the pedals 28. The torque sensor 82A can be realized using, for example, a strain sensor, a magnetostriction sensor, an optical sensor, or a pressure sensor. Any sensor can be used as long as the sensor outputs a signal corresponding to manual (human or muscular) power applied to the crank arms 40 or the pedals 28.

The rotational angle sensor 84 detects the rotational angle of the crank 26. The rotational angle sensor 84 is coupled to the frame 20 of the bicycle 10 or a housing of the first bicycle component 56A. The rotational angle sensor 84 includes a first element, which detects the magnetic field of a first magnet, and a second element, which outputs a signal corresponding to the positional relationship with a second magnet. The first magnet is located on one of the crankshaft 38 and the crank arms 40 coaxially with the crankshaft 38. The first magnet, which is an annular magnet, includes a plurality of magnetic poles alternately located in the circumferential direction. The first element detects the rotational angle of the crank 26 relative to the frame 20. As the crank 26 rotates once, the first element outputs a signal in cycles, each of which corresponds to the angle obtained by dividing 360 degrees by the number of magnetic poles of the same polarity. The minimum value of the rotational angle of the crank 26 that is detectable by the rotational angle sensor 84 is 180 degrees or less. The minimum value is preferably fifteen degrees and, further preferably, six degrees. The second magnet is located on one of the crankshaft 38 and the crank arms 40. The second element detects the reference angle of the crank 26 relative to the frame (e.g., top dead center or bottom dead center of crank 26). The second element outputs a signal, one cycle of which corresponds to one rotation of the crankshaft 38.

The rotational angle sensor 84 can include a magnetic sensor, which outputs a signal corresponding to the magnitude of the magnetic field, instead of the first element and the second element. In this case, instead of the first magnet and the second magnet, an annular magnet having a magnetic field, the magnitude of which changes in the circumferential direction, is arranged on the crankshaft 38 coaxially with the crankshaft 38. Use of a magnetic sensor that outputs a signal corresponding to the magnitude of the magnetic field allows one sensor to detect the rotation speed of the crank 26 and the rotational angle of the crank 26. This simplifies the structure and facilitates the assembling. The rotational angle sensor 84 can detect the rotation speed of the crank 26 in addition to the rotational angle of the crank 26. The rotation speed of the crank 26 can be detected from any one of the output of the first element, the output of the second element, and the output of the magnetic sensor.

The electronic controller 76A of the first bicycle component 56A controls the first motor 72A in multiple actuation modes. The multiple actuation modes include a first assist mode A1, a second assist mode A2, a third assist mode A3, a fourth assist mode A4, and a fifth assist mode A5. The multiple actuation modes A1 to A5 of the first bicycle component 56A differ from each other in the output state of the first motor 72A. The electronic controller 76A switches the actuation modes A1 to A5 based on an operation signal from the operating device 53. In the first assist mode A1, the ratio of the output of the first motor 72A to manual (human or muscular) power inputted to the crankshaft 38 (hereafter, referred to as "the first assist ratio") is high. In the third assist mode A3, the first assist ratio is low. In the second assist mode A2, the first assist ratio is lower than that of the first assist mode A1 and higher than that of the third assist mode A3. In the fourth assist mode A4, the driving of the first motor 72A is stopped, and the first assist ratio is "0." In the fifth assist mode A5, which is a mode for walking, the output of the first motor 72A is controlled in accordance with an operation of the operating unit 66 and an output of the vehicle speed sensor 55.

The first shifting apparatus 58A includes a first shifting device 84A, a electronic controller 86A, an actuator 87A, a communication unit 88A, and a shifting state detection device 89A. The communication unit 88A can also be considered to be a wired or wireless communicator.

The first shifting device 84A is configured to change the transmission ratio of the bicycle 10 in a stepped manner. In one example, the first shifting device 84A is configured to change a transmission ratio that is the ratio of the rotation speed of the rear wheel 14 to the rotation speed of the crankshaft 38. The first shifting device 84A includes an internal shifting device. The internal shifting device is located on a hub of the rear wheel 14. The internal shifting device can be located in the power transmission path extending between the crank 26 and the front rotation body 32. In another example, the first shifting device 84A is configured to change the transmission ratio by moving the chain 36 between a plurality of front sprockets or rear sprockets. In this case, the first shifting device 84A includes an external shifting device (derailleur). The external shifting device includes at least one of a front external shifting device, which moves the chain 36 between a plurality of front sprockets, and a rear external shifting device, which moves the chain 36 between a plurality of rear sprockets. In a case in which the first shifting device 84A does not include an external shifting device, the front rotation body 32 can include a front pulley. Additionally, the rear rotation body 34 can include a rear pulley that is connected to the front rotation body 32 by a belt. In a case in which the first shifting device 84A does not include an external shifting device, the front rotation body 32 can include a front bevel gear. Additionally, the rear rotation body 34 can include a rear bevel gear that is connected to the front rotation body 32 by a drive shaft. In a case in which the first shifting device 84A includes an external shifting device, at least one of the front rotation body 32 and the rear rotation body 34 includes a plurality of sprockets that differ from each other in the number of teeth.

The electronic controller 86A includes an arithmetic processing unit that executes predetermined control programs. The arithmetic processing unit includes, for example, a CPU or an MPU. The electronic controller 86A can include one or more arithmetic processing units. The electronic controller 86A includes at least one processor. The electronic controller 86A typically includes a general circuit such as an input interface circuit or an output interface circuit. If the electronic controller 86A receives a signal from the operating device 53 or the bicycle component 56 for changing the transmission ratio, then the electronic controller 86A drives the actuator 87A.

The actuator 87A includes an electric motor. If the actuator 87A is driven, then the first shifting device 84A performs a shifting action to change the transmission ratio of the bicycle 10 in a stepped manner. In a case in which the first shifting device 84A is an internal shifting device, the shifting action includes an action that changes the coupling state of gears of a planetary gear mechanism located in the first shifting device 84A. In a case in which the first shifting device 84A is an external shifting device, the shifting action includes an action that moves the chain 36 between sprockets. The internal shifting device can include a continuously variable transmission (CVT) mechanism. In one example, the CVT mechanism includes a planetary mechanism that includes an input body, an output body, and a transmission body. Rotation of the transmission body continuously changes the transmission ratio. The first shifting apparatus 58A can include other components in addition to the first shifting device 84A and the actuator 87A.

The communication unit 88A is configured to communicate with other devices of the bicycle electronic system 50. The communication unit 88A, for example, receives a control signal from at least one of the operating device 53 and the first bicycle component 56A for actuating the actuator 87A. Additionally, the communication unit 88A transmits information generated by the electronic controller 86A to at least one of the first bicycle component 56A and the display device 90.

The shifting state detection device 89A detects the actuation state of the first shifting device 84A. In one example, the shifting state detection device 89A detects the position of a movable portion (not shown) of the first shifting apparatus 58A that moves in accordance with a change in the transmission ratio of the bicycle 10. In a case in which the first shifting device 84A is an external shifting device, the movable portion is, for example, a link mechanism or chain plate included in the external shifting device. In a case in which the first shifting device 84A is an internal shifting device, the movable portion is, for example, a rotation body that changes the connection state of gears in a planetary gear. The shifting state detection device 89A detects, for example, the actuation amount and actuation angle of the actuator 87A to detect the position of the movable portion.

The first bicycle component 56A controls the first shifting device 84A of the bicycle 10. The multiple actuation modes of the first bicycle component 56A include a mode (hereafter, referred to as "the adjusting mode C1") that allows for a change in the setting of the first shifting device 84A and a mode (hereafter, referred to as "the shifting mode C2") in which the first shifting device 84A performs the shifting action in accordance with an operation of the operating device 53.

In the adjusting mode C1, if the operating device 53 is operated to adjust the position of the movable portion of the first shifting apparatus 58A, then the electronic controller 76A of the first bicycle component 56A adjusts the position of the movable portion in a stepped manner in accordance with the operation signal from the operating device 53.

In the shifting mode C2, if the operating device 53 is operated to actuate the first shifting device 84A, then the electronic controller 76A of the first bicycle component 56A transmits a control signal for actuating the first shifting device 84A to the electronic controller 86A of the first shifting apparatus 58A. The electronic controller 86A of the first shifting apparatus 58A drives the actuator 87A in accordance with the control signal to change the transmission ratio of the bicycle 10.

As shown in FIG. 3, the second bicycle component 56B includes a second motor 72B. The second bicycle component 56B further includes a drive circuit 74B, a electronic controller 76B, a communication unit 80B, a memory device 78B, and a torque sensor 82B. The communication unit 80B can also be considered to be a wired or wireless communicator.

The second motor 72B assists propulsion of the bicycle 10. The second motor 72B, the drive circuit 74B, the electronic controller 76B, the communication unit 80B, the memory device 78B, and the torque sensor 82B are respectively configured in the same manner as the first motor 72A, the drive circuit 74A, the electronic controller 76A, the communication unit 80A, the memory device 78A, and the torque sensor 82A of the first bicycle component 56A. The configurations and functions of the first motor 72A, the drive circuit 74A, the electronic controller 76A, the communication unit 80A, the memory device 78A, and the torque sensor 82A of the first bicycle component 56A can be the same as or different from those of the second motor 72B, the drive circuit 74B, the electronic controller 76B, the communication unit 80B, the memory device 78B, and the torque sensor 82B of the second bicycle component 56B, respectively.

The electronic controller 76B of the second bicycle component 56B controls the second motor 72B in multiple actuation modes. The multiple actuation modes include a first assist mode B1, a second assist mode B2, a third assist mode B3, a fourth assist mode B4, and a fifth assist mode B5. The multiple assist modes B1 to B5 of the second bicycle component 56B differ from each other in the output state of the second motor 72B. The electronic controller 76B switches the assist modes B1 to B5 based on an operation signal from the operating device 53. In the first assist mode B1, the ratio of the output of the second motor 72B to manual (human or muscular) power inputted to the crankshaft 38 (hereafter, referred to as "the second assist ratio") is high. In the third assist mode B3, the second assist ratio is low. The second assist ratio of the second assist mode B2 is lower than that of the first assist mode B1 and higher than that of the third assist mode B3. In the fourth assist mode B4, the driving of the second motor 72B is stopped, and the second assist ratio is "0." In the fifth assist mode B5, which is a mode for walking, the output of the second motor 72B is controlled in accordance with an operation of the operating unit 66 and an output of the vehicle speed sensor 55.

The second shifting apparatus 58B includes a second shifting device 84B, an electronic controller 86B, an actuator 87B, a communication unit 88B, and a shifting state detection device 89B. The second shifting device 84B, the electronic controller 86B, the actuator 87B, the communication unit 88B, and the shifting state detection device 89B are configured in the same manner as the first shifting device 84A, the electronic controller 86A, the actuator 87A, the communication unit 88A, and the shifting state detection device 89A of the first shifting apparatus 58A. The configurations and functions of the first shifting device 84A, the electronic controller 86A, the actuator 87A, the communication unit 88A, and the shifting state detection device 89A of the first shifting apparatus 58A can be the same as or different from those of the second shifting device 84B, the electronic controller 86B, the actuator 87B, the communication unit 88B, and the shifting state detection device 89B of the second shifting apparatus 58B, respectively. The second shifting apparatus 58B does not have to include the shifting state detection device 89B.

The second bicycle component 56B controls the second shifting device 84B of the bicycle 10. The multiple actuation modes of the second bicycle component 56B include a mode (hereafter, referred to as "the adjusting mode E1") that allows for a change in the setting of the second shifting device 84B and a mode (hereafter, referred to as "the shifting mode E2") in which the second shifting device 84B performs a shifting action in accordance with the operating device 53.

In the adjusting mode E1, if the operating device 53 is operated to adjust the position of a movable portion of the second shifting apparatus 58B, then the electronic controller 76B of the second bicycle component 56B adjusts the position of the movable portion in a stepped manner in accordance with the operation signal from the operating device 53.

The shifting mode E2 includes a manual shifting mode E21 and an automatic shifting mode E22.

In the manual shifting mode E21, if the operating device 53 is operated to actuate the second shifting device 84B, then the electronic controller 76B of the second bicycle component 56B transmits a control signal for actuating the second shifting device 84B to the electronic controller 86B of the second shifting apparatus 58B. The electronic controller 86B of the second shifting apparatus 58B drives the actuator 87B to change the transmission ratio of the bicycle 10 in accordance with the control signal.

In the automatic shifting mode E22, the electronic controller 76B of the second bicycle component 56B is configured to control the second shifting device 84B based on the riding state of the bicycle 10. The electronic controller 76B of the second bicycle component 56B, for example, actuates the second shifting device 84B based on at least one of the output of the vehicle speed sensor 55 and the rotation speed of the crank 26. If the second bicycle electronic system 50B includes a sensor similar to the rotational angle sensor 84 of the first bicycle component 56A, then the rotation speed of the crank 26 can be obtained from the sensor.

The bicycle display device 90 (hereafter, referred to as "the display device 90") is configured to be mounted on the bicycle 10. The display device 90 includes a communication unit 91, a display 92 and an electronic controller 93. In one example, the display device 90 further includes a memory device 94, a housing 95 (refer to FIG. 4), and an operating unit 96. The operating unit 96 includes a first button 96A and the second button 96B. The operating unit 96 can include a touchscreen located on the display 92. The communication unit 91 can also be considered to be a wired or wireless communicator.

As shown in FIG. 4, the housing 95 is coupled to a holder 95A, which is attachable to the bicycle main body 16, so that the housing 95 is attachable to and removable from the holder 95A. In one example, the holder 95A is coupled to the handlebar 24. The display device 90 is mounted on the bicycle 10 by the holder 95A. The housing 95 includes an engagement portion (not shown) that is engageable with an engaged portion of the holder 95A. The housing 95 accommodates the communication unit 91, the electronic controller 93, and the memory device 94. The display 92, the first button 96A, and the second button 96B are located in the housing 95 so as to be exposed to the exterior of the housing 95. In a case in which the display device 90 and the battery 62 are connected by wire, the pushing of the first button 96A switches between an activation state, in which power is supplied from the battery 62 to each device, and a deactivation state, in which power is not supplied from the battery 62 to the device. The pushing of the second button 96B switches the lamp 54 between the illuminated state and the unilluminated state. For example, in a case in which the display device 90 includes a battery that differs from the battery 62 and performs wireless communication with the bicycle component 56, the pushing of the first button 96A switches the display device 90 between an activation state and deactivation state. In this case, the battery unit 52 can be configured to constantly supply power to each device that is connected by wire. Alternatively, the battery unit 52 can include a power switch that switches between the activation state, in which power is supplied from the battery 62 to each device, and the deactivation state, in which power is not supplied from the battery 62 to the device.

The communication unit 91 is communicably connected to the bicycle component 56. The communication unit 91 includes a communication port that is communicable with the bicycle component 56 through wire connection. In another example, the communication unit 91 includes a wireless communication module that is communicable with the bicycle component 56 through wireless connection. The communication unit 91 can include both of the communication port and the wireless communication module. In a case in which the display device 90 is connected to at least one of the bicycle component 56 and the battery unit 52 by wire, the housing 95 is provided with an opening, through which a cable is connected.

The display 92 is configured to show one or more images P on a screen D. Each image P includes at least one of a character and an icon. In one example, the display 92 includes a liquid crystal display. In another example, the display 92 includes a segment display or an organic EL display. The display 92 is configured to show the images P related to the bicycle electronic system 50 on a screen D1 including a plurality of regions R (refer to FIG. 5), each of which is configured to show the corresponding one of the images P. The display 92 is configured to show the images P related to a plurality of items that are settable in correspondence with the bicycle component 56 on a setting menu screen D2 (refer to FIG. 11). The display 92 is configured to show the image P related to one settable item on a setting menu screen D3 (refer to FIGS. 9, 10, 12, and 13). The setting menu screen D3 can show the images P related to non-settable items (e.g., images P related to time, charge level of battery 62, and illumination state of lamp).

Figure 5:
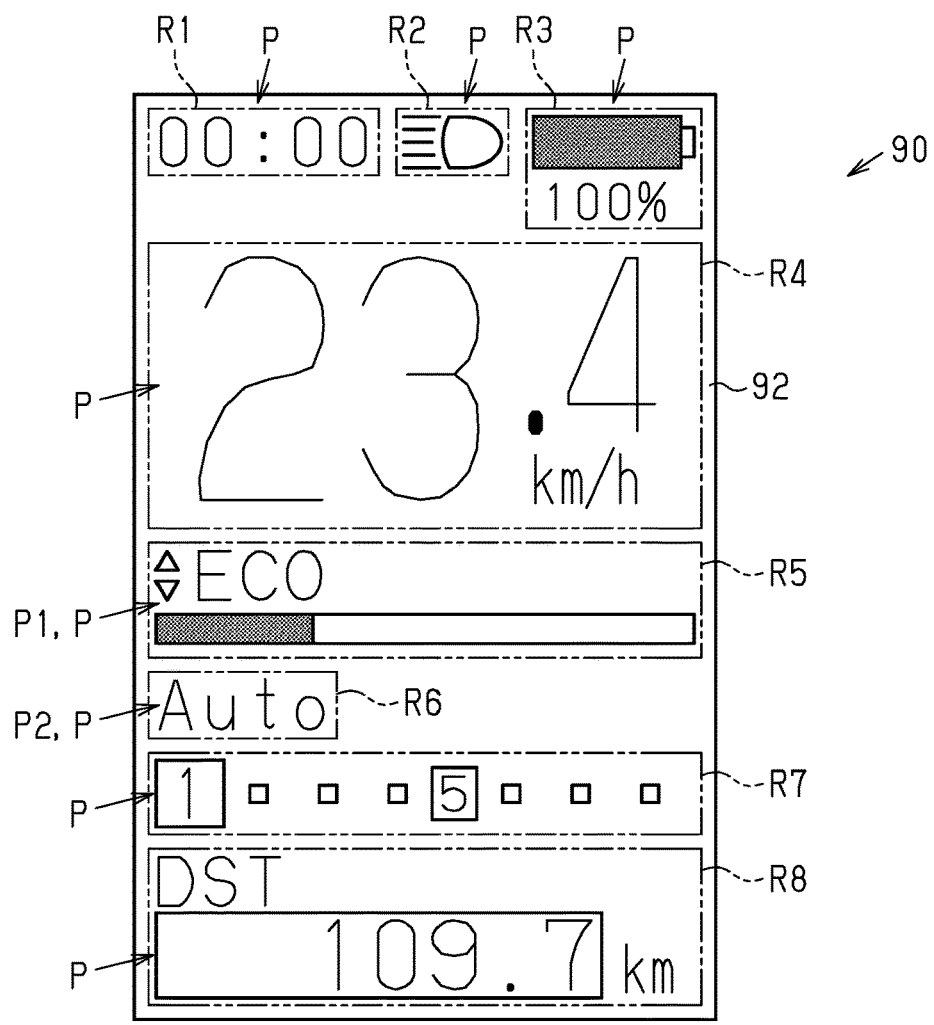
FIG. 5 is a diagram showing a first example shown on a screen of the bicycle display device of FIG. 4.

As shown in FIG. 5, the display 92 is configured to show the image P related to the actuation mode of the bicycle components 56 of different types. The display 92 is configured to show the image P related to one of the speed of the bicycle 10, the charge level of the battery 62, time, the state of the lamp 54, the actuation mode of the bicycle component 56, the heart rate, the blood pressure, and cadence in each of a plurality of display regions R.

In a case in which the communication unit 91 is communicably connected to the first bicycle component 56A and communicably disconnected from the second bicycle component 56B, the electronic controller 93 shows an image P1 corresponding to the actuation mode of the first bicycle component 56A on the display 92. In a case in which the communication unit 91 is communicably connected to the second bicycle component 56B and communicably disconnected from the first bicycle component 56A, the electronic controller 93 shows an image P1 corresponding to the second bicycle component 56B on the display 92.

The electronic controller 93 shown in each of FIGS. 2 and 3 includes an arithmetic processing unit that executes predetermined control programs. The arithmetic processing unit includes, for example, a CPU or an MPU. The electronic controller 93 can include one or more microcomputers. The electronic controller 93 further includes a timer and a graphics processing unit (GPU). The GPU can be incorporated in the CPU or MPU or can be separate from the CPU or MPU.

The memory device 94 stores information used for various kinds of control programs and various kinds of control processes. The memory device 94 includes, for example, a nonvolatile memory and a volatile memory and can includes a ROM (Read Only Memory) device, a RAM (Random Access Memory) device, a hard disk, a flash drive, etc. The memory device 94 is any computer storage device or any computer readable medium with the sole exception of a transitory, propagating signal. The memory device 94 stores information for showing the images P on the display 92. The information stored in the memory device 94 for showing the images P is at least partially associated with one or both of the first bicycle component 56A and the second bicycle component 56B. To specify the type of the connected bicycle component 56, identification information of the bicycle component 56 connected to the electronic controller 93 of the display device 90 can be obtained. Then, the electronic controller 93 can determine the type of the connected bicycle component 56 based on information related to the types of the bicycle components 56 stored in the memory device 94. The type of the connected bicycle component 56 can be specified by the user operating the operating unit 96 or a predetermined switch or button of the operating unit 96. Alternatively, an external device communicably connected to the communication unit 91 can be used.

The memory device 94 stores setting information of the bicycle 10. The setting information includes, for example, the diameter of a tire and the attachment angle of the bicycle component 56. The setting information can be obtained from the bicycle component 56 or an external device of the bicycle electronic system 50. In a state where an external device is connected to the bicycle electronic system 50, if an operation for updating the setting information is performed on the external device, then the electronic controller 93 of the display device 90 updates the setting information stored in the memory device 94 of the display device 90 based on the setting information transmitted from the external device. Additionally, the electronic controllers 76A, 76B of the bicycle components 56 update the setting information stored in the memory devices 78A, 78B of the bicycle components 56 based on the setting information transmitted from the external device.

FIG. 5 shows one example of the screen D1. The screen D1 includes a first display region R1, a second display region R2, a third display region R3, a fourth display region R4, a fifth display region R5, a sixth display region R6, a seventh display region R7, and an eighth display region R8. The first display region R1 shows time using the image P of characters. The time is shown using the timer of the electronic controller 93. The second display region R2 shows the image P of an icon that indicates the illuminated state if the lamp 54 is in the illuminated state and does not show the icon if the lamp 54 is in the unilluminated state. The third display region R3 shows the speed of the bicycle 10 using the image P of characters. Information obtained from the vehicle speed sensor 55 is used to show the speed of the bicycle 10.

The fifth display region R5 shows the image P1 related to the actuation modes of the motors 72A, 72B. The image P1 includes information related to the assist ratio. The image P1 includes characters and an icon. In a case in which the first bicycle component 56A is connected, the fifth display region R5 shows the image P1 of the combination of characters corresponding to each actuation mode of the first motor 72A and allowing the user to intuitively understand the concept of the actuation mode with an icon indicating the magnitude of assist power in the actuation mode. In a case in which the second bicycle component 56B is connected, the fifth display region R5 shows the image P1 of the combination of characters corresponding to each actuation mode of the second motor 72B and allowing the user to intuitively understand the concept of the actuation mode with an icon indicating the magnitude of assist power in the actuation mode. In the first to third assist modes of the first bicycle component 56A, at least one of the assist power and the maximum motor output torque can be the same as or different from the first to third assist modes of the second bicycle component 56B that have the respective magnitude relationships of the assist power. Thus, in a case in which the first motor 72A and the second motor 72B are controlled in actuation modes indicated by different characters, the same control or different controls can be performed on the first motor 72A and the second motor 72B. In a case in which the first motor 72A and the second motor 72B are controlled in actuation modes indicated by the same characters, the same control or different controls can be performed on the first motor 72A and the second motor 72B.

Chart 1 shows examples of characters contained in the image P1 corresponding to the actuation modes of the first bicycle component 56A and shown in the fifth display region R5. Chart 2 shows examples of characters contained in the image P1 corresponding to the actuation modes of the second bicycle component 56B. In one example, the memory device 94 stores a table related to the images P1 shown in Charts 1 and 2. In a case the bicycle component 56 connected to the memory device 94 is the first bicycle component 56A, the memory device 94 displays the image P1 based on Chart 1. In a case in which the bicycle component 56 connected to the memory device 94 is the second bicycle component 56B, the memory device 94 shows the image P1 based on Chart 2.

CHART 1

| Actuation Mode | Characters |
| --- | --- |
| 1st Assist Mode A1 | BOOST |
| 2nd Assist Mode A2 | TRAIL |
| 3rd Assist Mode A3 | ECO |
| 4th Assist Mode A4 | OFF |
| 5th Assist Mode A5 | WALK |

CHART 2

| Actuation Mode | Characters |
| --- | --- |
| 1st Assist Mode B1 | HIGH |
| 2nd Assist Mode B2 | NORMAL |
| 3rd Assist Mode B3 | ECO |
| 4th Assist Mode B4 | OFF |
| 5th Assist Mode B5 | WALK |

The sixth display region R6 shows an image P2 related to the actuation modes of the shifting devices 84A, 84B using characters. The actuation modes of the shifting devices 84A, 84B include an automatic shifting mode, in which the bicycle component 56 is configured to control the shifting devices 84A, 84B, for example, in accordance with the riding state of the bicycle 10 such as the vehicle speed and the rotational angle of the crank 26, and an automatic shifting mode, in which the shifting devices 84A, 84B are controllable only by operation of the operating unit 66. In the case of the automatic shifting mode, the display 92 shows the image P2 including, for example, "Auto." In the case of the manual shifting mode, the display 92 shows the image P2 including, for example, "Manual." In a case in which the bicycle electronic system 50 includes the first shifting apparatus 58A that cannot be actuated in the automatic shifting mode, even if the operating device 53 is operated to switch to the automatic shifting mode, the electronic controller 93 of the display device 90 does not show the image P2 related to the automatic shifting mode.

The seventh display region R7 shows the present shifting position with characters and icons. If the shifting position is changed by operation of the operating unit 66 or control performed by the bicycle component 56, then the seventh display region R7 shows the image P corresponding to the changed shifting position.

Figure 7:
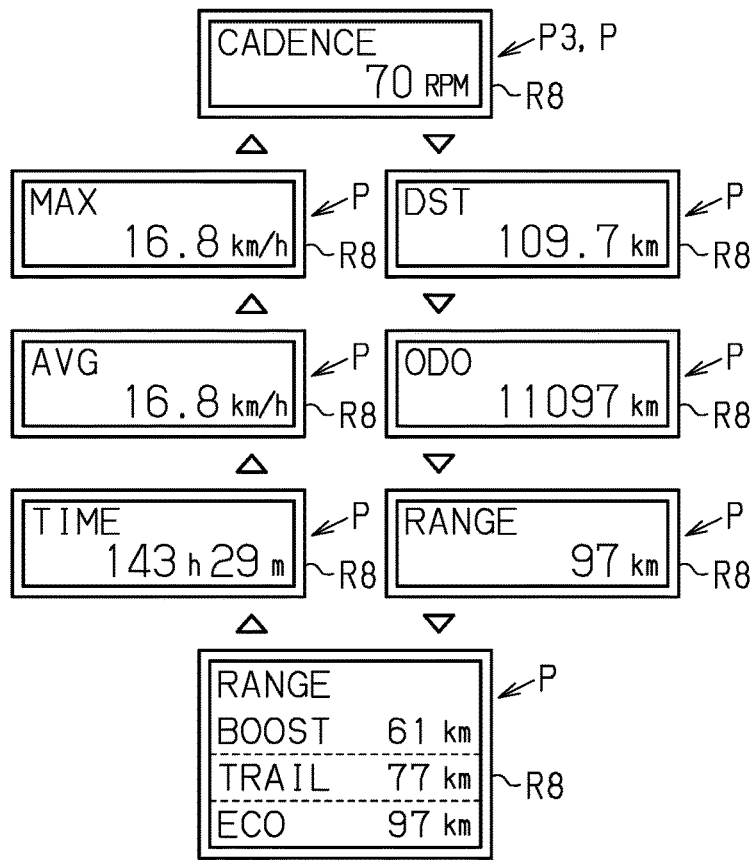
FIG. 7 is a diagram showing a second example shown on the screen of the bicycle display device of FIG. 4.
Figure 8:
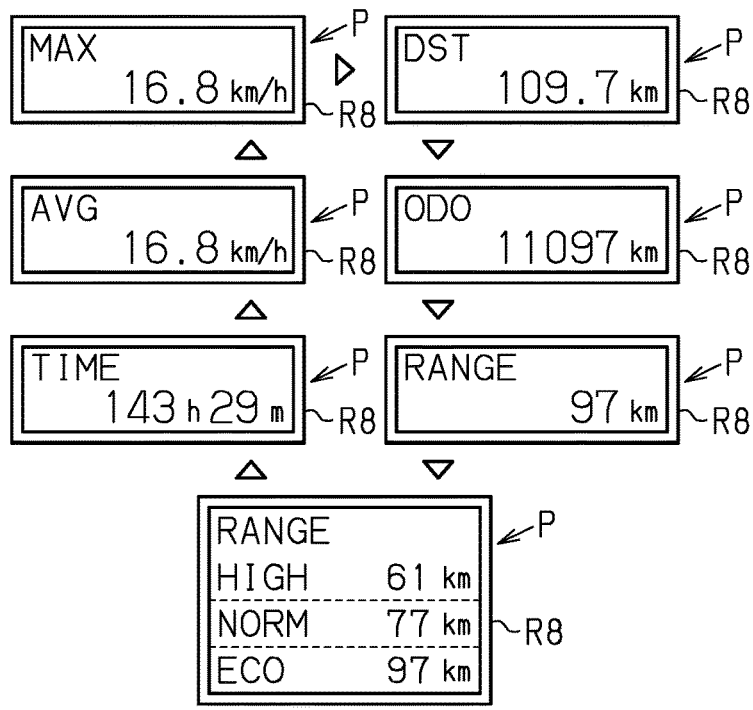
FIG. 8 is a diagram showing a third example shown on the screen of the bicycle display device of FIG. 4.

The eighth display region R8 shows the image P related to the riding of the bicycle 10. The image P shown in the eighth display region R8 is changed in a predetermined order in accordance with an operation of the operating unit 66. The image P configured to be shown in the eighth display region R8 includes the travel distance of the present trip, the accumulated travel distance, the distance travelled in the present assist mode in the present trip, the travelable distance in each assist mode estimated from the charge level of the battery 62, the travel time in multiple trips, the average vehicle speed, the highest vehicle speed, and the rotation speed of the crank 26 (cadence). FIG. 7 shows one example of changes in the presentation of the eighth display region R8 in a case in which the first bicycle component 56A is connected. FIG. 8 shows one example of changes in the presentation of the eighth display region R8 in a case in which the second bicycle component 56B is connected. Since the second bicycle electronic system 50B does not include the rotational angle sensor 84, an image P3 related to the rotation speed of the crank 26 is not included in the predetermined order. In a case in which the second bicycle electronic system 50B includes the rotational angle sensor 84, the image P3 related to the rotation speed of the crank 26 can be configured so as not to be included in the predetermined order.

Figure 6:
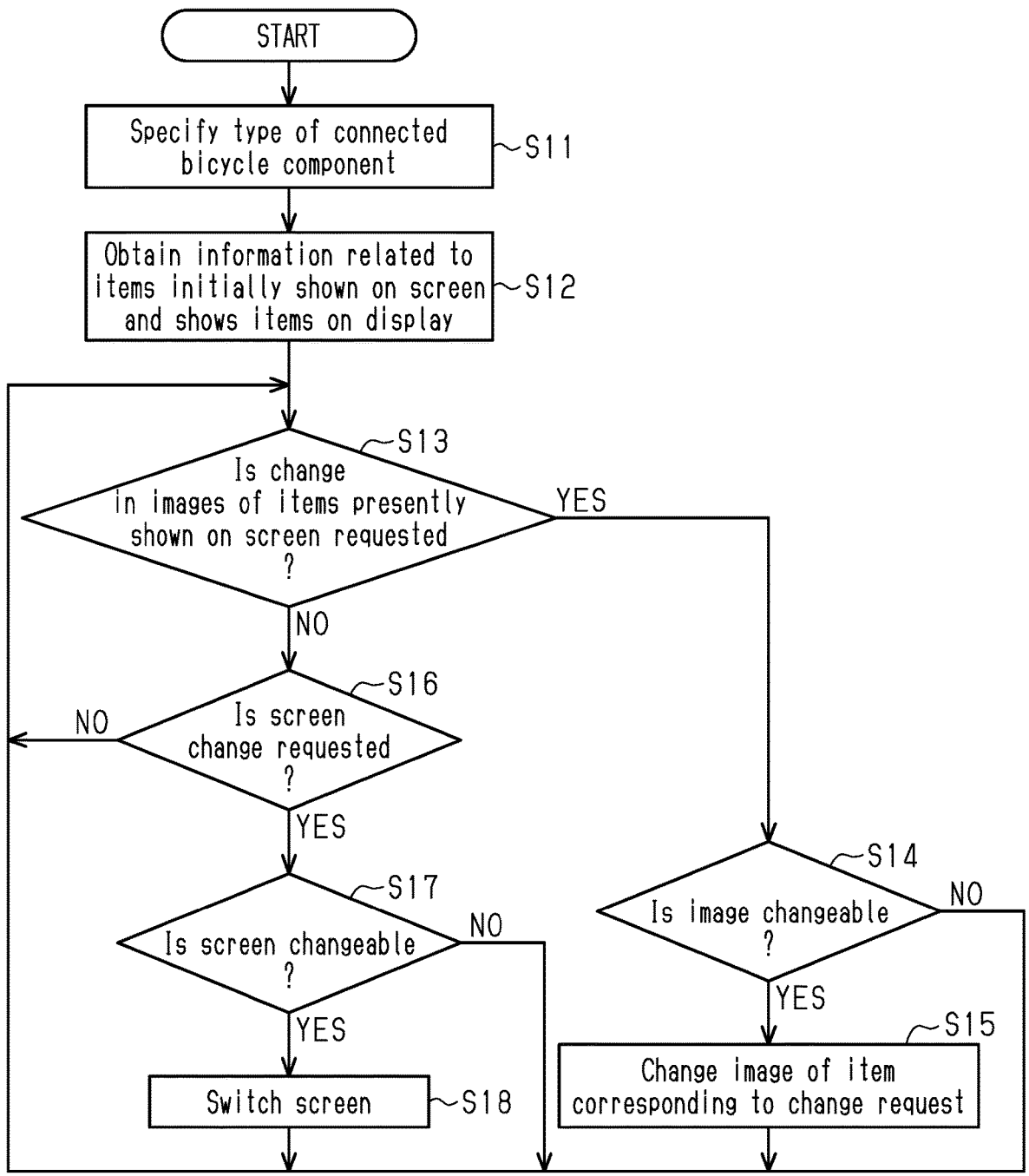
FIG. 6 is a flowchart of control performed by the bicycle display device of FIG. 4 for changing the presentation of a display.

The control performed by the electronic controller 93 for changing the image P shown in the display 92 and the screen D will now be described with reference to FIG. 6.

In step S11, if the first button 96A is pushed to supply the power to the display device 90, then the electronic controller 93 specifies the type of the bicycle component 56 communicably connected to the communication unit 91 and proceeds to step S12. In a state where the bicycle component 56 is communicably connected for the first time, the electronic controller 93 can store the type of the bicycle component 56 in the memory device 94. Then, if the power is supplied, then the electronic controller 93 can specify the type of the connected bicycle component 56 based on the information stored in the memory device 94. In another example, each time the first button 96A is pushed to supply the power to the display device 90, the electronic controller 93 can communicate the bicycle component 56 and obtain the identification information of the bicycle component 56 to specify the type of the connected bicycle component 56.

In step S12, the electronic controller 93 obtains information related to items shown on a predetermined initial screen D (e.g., screen D1 of FIG. 5) so that the display 92 shows the items and then proceeds to step S13.

In step S13, the electronic controller 93 determines whether or not a change in the images P of the items presently shown on the screen D has been requested. More specifically, in a case in which an operation related to the items presently shown on the screen D is performed on the operating unit 66 of the operating device 53 or the operating unit 96 of the display device 90 and the content of the items presently shown on the screen D is changed in accordance with the traveling of the bicycle 10 and the time, the electronic controller 93 determines that the change in the images P of the items presently shown on the screen D has been requested. Additionally, in a case in which one of the devices included in the bicycle electronic system 50 performs an action for changing the content of the items presently shown on the screen D, the electronic controller 93 can determine that the change in the images P of the items presently shown on the screen D has been requested. If the electronic controller 93 determines that the change in the images P of the items presently shown on the screen D has been requested, then the electronic controller 93 proceeds to step S14 and determines whether or not the image P is changeable. If the electronic controller 93 determines that the image P is not changeable, then the electronic controller 93 proceeds to step S13. For example, in a case in which the connected bicycle component 56 does not have the function corresponding to the image P that has been requested to change, the electronic controller 93 determines that the image P is not changeable. In another example, in a case in which an operation for increasing the transmission ratio is performed on the operating unit 66 of the operating device 53 under a condition in which the transmission ratio is maximal, the electronic controller 93 determines that the image P is not changeable. The contents of items shown in the first display region R1, the third display region R3, the fourth display region R4, and the eighth display region R8 are changed in accordance with the traveling of the bicycle 10 and the time.

If the electronic controller 93 determines that the image P is changeable, then the electronic controller 93 proceeds to step S15 and changes the image P of the item corresponding to the change request. For example, in a case in which a shift-up operation is performed on the operating unit 66, the electronic controller 93 changes the image P shown in the seventh display region R7 to an image conforming to the changed shifting position. In another example, in a case in which an operation for switching the content shown in the eighth display region R8 is performed on the operating unit 66, the image P shown in the eighth display region R8 is changed in the predetermined order.

If the electronic controller 93 determines in step S13 that there is no request for changing the images P of items presently shown on the screen D, then the electronic controller 93 proceeds to step S16 and determines whether or not an operation for changing the screen D that is set or shown has been performed. More specifically, in a case in which an operation for changing the image P shown on the screen D or an operation for switching the screen D is performed on the operating unit 66 of the operating device 53 or the operating unit 96 of the display device 90, the electronic controller 93 proceeds to step S17. In step S17, the electronic controller 93 determines whether or not the screen D is changeable. If the electronic controller 93 determines that the screen D is not changeable, then the electronic controller 93 proceeds to step S13. For example, in a case in which the connected bicycle component 56 does not have the function corresponding to the screen D that has been requested to change, the electronic controller 93 determines that the screen D is not changeable.

If the electronic controller 93 determines that the screen D is changeable, then the electronic controller 93 proceeds to step S18 and switches the screen D corresponding to the change request. For example, in a state where the display 92 shows the screen D1 of FIG. 5, if an operation for switching the bicycle components 56A, 56B from the shifting mode to the adjusting mode is performed on the operating unit 66, then the display 92 shows the screen D2 shown in FIG. 9 so that the position of the movable portion of the shifting apparatus 58 is adjusted.

In step S18, the electronic controller 93 switches the screen D based on the operation, which was performed on the operating unit 66 of the operating device 53 or the operating unit 96 of the display device 90 and detected in step S16, and again returns to step S13. The present control terminates if the first button 96A is pushed to stop the supply of power to the display device 90. In step S18, in a case in which the operating unit 66 of the operating device 53 or the operating unit 96 of the display device 90 is not operated for a predetermined time, the electronic controller 93 can again proceed to step S13.

Figure 9:
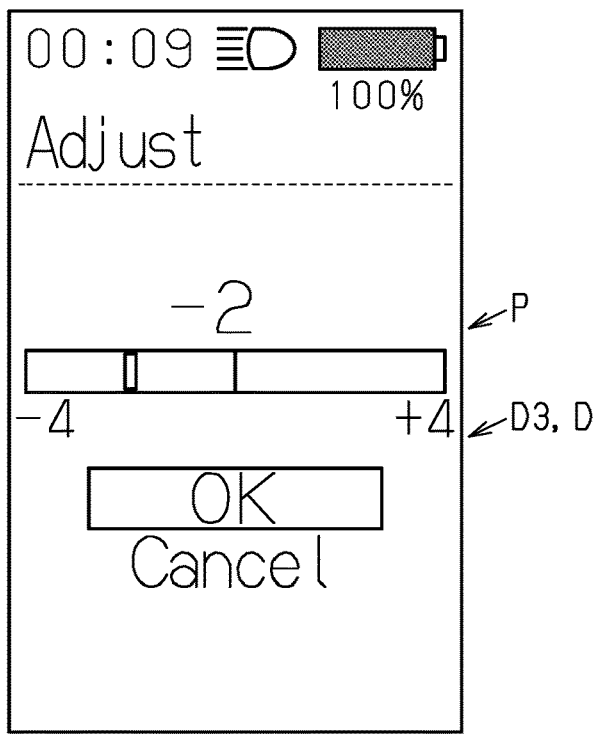
FIG. 9 is a diagram showing a fourth example shown on the screen of the bicycle display device of FIG. 4.
Figure 10:
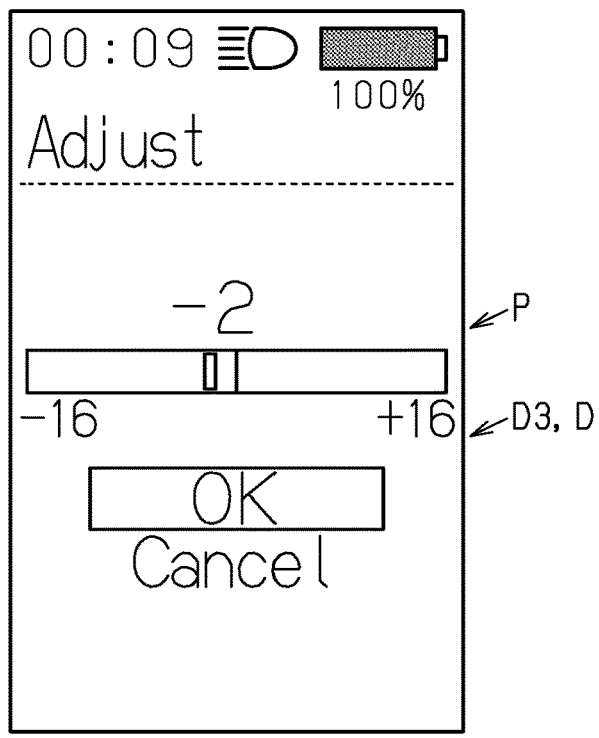
FIG. 10 is a diagram showing a fifth example shown on the screen of the bicycle display device of FIG. 4.

The electronic controller 93 changes the image P1 shown on the display 92 in accordance with the type of the bicycle component 56 communicably connected to the communication unit 91. In a case in which the bicycle electronic system 50 includes the first bicycle component 56A, the image P1 shown in the fifth display region R5 of FIG. 5 differs from that in a case in which the bicycle electronic system 50 includes the second bicycle component 56B. In a case in which the bicycle electronic system 50 includes the first bicycle component 56A, the image P2 shown in the sixth display region R6 of FIG. 5 differs from that in a case in which the bicycle electronic system 50 includes the second bicycle component 56B. As shown in FIGS. 9 and 10, on the screen D2 used to adjust the position of the movable portion of the shifting apparatus 58, the characters indicating the position of the movable portion in a stepped manner is changed in accordance with the type of the shifting apparatus 58 included in the bicycle electronic system 50. In the bicycle electronic system 50, the position of the movable portion of the shifting apparatus 58 is changed via the bicycle component 56. Thus, the characters indicating the position of the movable portion in a stepped manner are changed in accordance with the type of the bicycle component 56.

In a case in which an item corresponding to one of the images P contained in the setting menu screen D2 is not settable for the bicycle component 56 communicably connected to the communication unit 91, the electronic controller 93 controls the display 92 so that the display 92 does not show the image P related to the item that is not settable. The item is related to an action of the shifting devices 84A, 84B mounted on the bicycle 10. The item is related to a method for controlling the shifting devices 84A, 84B in a case in which the transmission ratio of the bicycle 10 is changed.

In a case in which the first shifting device 84A of the first shifting apparatus 58A shown in FIG. 2 includes a derailleur, the derailleur includes a protection mechanism that interrupts the transmission of power between the actuator 87A and the first shifting device 84A in case of application of a shock. If the transmission of power is interrupted between the actuator 87A and the first shifting device 84A, then the actual position of the movable portion differs from the position of the movable portion of the first shifting apparatus 58A that is detected from an output of the shifting state detection device 89A. The electronic controller 76A of the first bicycle component 56A restores the protection mechanism to a state where the power is transmitted between the actuator 87A and the first shifting device 84A. Also, the electronic controller 76A of the first bicycle component 56A executes restoring control that controls the first shifting apparatus 58A so that the detected position of the movable portion of the first shifting apparatus 58A conforms to the actual assumed position.

Figure 12:
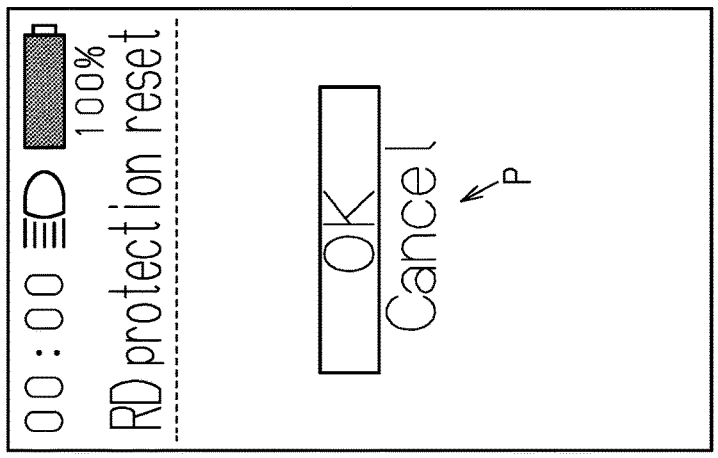
FIG. 12 is a diagram showing a seventh example shown on the screen of the bicycle display device of FIG. 4.
Figure 11:
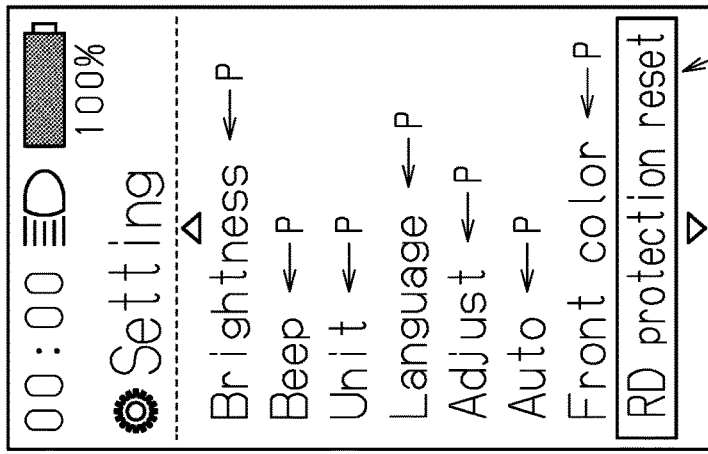
FIG. 11 is a diagram showing a sixth example shown on the screen of the bicycle display device of FIG. 4.

In a state where the display 92 shows the setting menu screen D2 of FIG. 11, if an operation for executing the restoring control is performed to restore the protection mechanism, in the first bicycle electronic system 50A, then the electronic controller 93 of the display device 90 shows the screen D2 of FIG. 12 on the display 92 to confirm the execution of the control. The operation for executing the restoring control, which restores the protection mechanism, is performed by selecting the item ("RD protection reset" in FIG. 11) shown on the setting menu screen D2. In the state of FIG. 12, if the operating device 53 is operated to execute the control for conforming the detected position of the movable portion of the first shifting apparatus 58A to the actual position of the movable portion, then the electronic controller 93 of the display device 90 shows the screen D, which includes the image P shown in FIG. 13 for prompting an action of the user, on the display 92. The action of the user includes manual rotation of the crank 26. The image P prompting the action of the user includes a schematic diagram of the crank 26 and arrow marks that prompt rotation of the crank 26. The schematic diagram of the crank 26 and the arrow marks prompting the rotation of the crank 26 can be shown as a moving image so that the schematic diagram of the crank 26 seems to be rotating. In a case in which the first shifting device 84A is a rear derailleur, the electronic controller 93 actuates the actuator 87A to move the movable portion to a position corresponding to the rear sprocket having the largest number of teeth. This conforms the position of the moving portion of the first shifting apparatus 58A obtained based on the detection result of the shifting state detection device 89A to the actual position of the movable portion. After actuating the actuator 87A to move the movable portion of the first shifting apparatus 58A to the position corresponding to the rear sprocket having the largest number of teeth based on the detection result of the shifting state detection device 89A, the electronic controller 93 shows the screen D of FIG. 13 until a predetermined time elapses. After the predetermined time elapses, the electronic controller 93 shows the setting menu screen D2 of FIG. 11 on the display 92.

Figure 13:
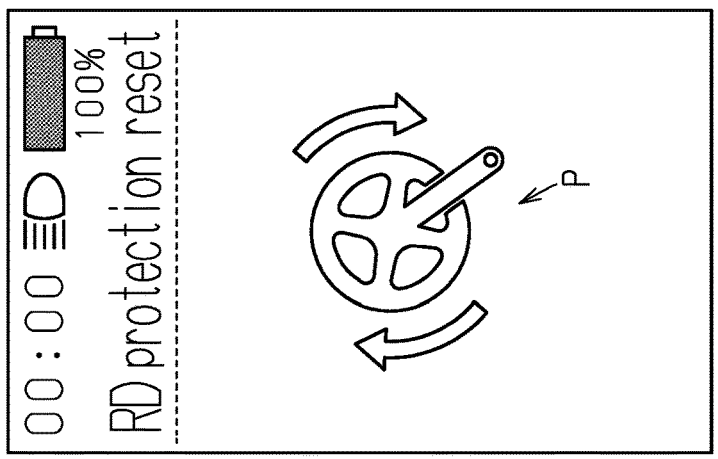
FIG. 13 is a diagram showing an eighth example shown on the screen of the bicycle display device of FIG. 4.

In a case in which the second shifting device 84B of the second shifting apparatus 58B shown in FIG. 3 includes an internal shifting device, if the operation for executing the restoring control is performed to restore the protection mechanism in a state where the display 92 shows the setting menu screen D2 of FIG. 11, then the second bicycle electronic system 50B maintains the presentation of the setting menu screen D2 of FIG. 11 without changing to the screens D of FIGS. 12 and 13.

Second Embodiment

A second embodiment of a display device 90 will now be described with reference to FIGS. 2, 3, 5, 14, and 15. The second embodiment of the display device 90 has the same structure as the first embodiment of the display device 90 except in that sizes of the images P shown on the screen D1 are changed in accordance with the type of a connected electronic device. Same reference characters are given to those elements that are the same as the corresponding elements of the first embodiment. Such elements will not be described in detail.

The communication unit 91 shown in each of FIGS. 2 and 3 is communicably connected to electronic devices that are mounted on the bicycle 10 or carried by the rider of the bicycle 10. The electronic devices including at least one of the bicycle component 56 mounted on the bicycle 10 and a sensor carried by the rider include each device of the bicycle electronic system 50. The electronic devices include the battery unit 52, the operating device 53, the lamp 54, the vehicle speed sensor 55, and the bicycle component 56.

As shown in FIG. 5, the display 92 is configured to show the images P related to the electronic devices in each of the display regions R contained in the one screen D1. The electronic controller 93 changes the size of at least one of the display regions R in accordance with the electronic devices communicably connected to the communication unit 91. The electronic controller 93 changes the sizes of the display regions R in accordance with a predetermined priority order of images related to the electronic devices. The electronic controller 93 is configured to change the predetermined priority order.

Figure 14:
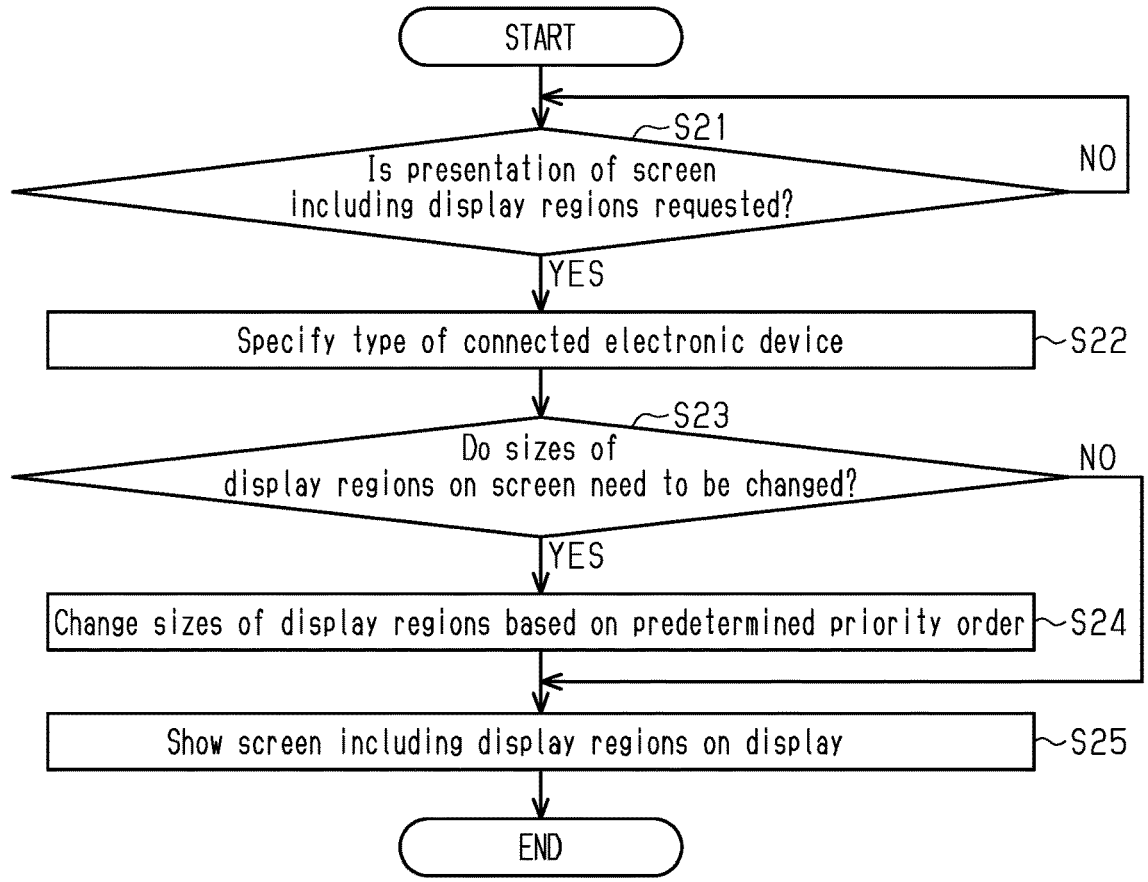
FIG. 14 is a flowchart of control performed by a second embodiment of a bicycle display device for changing a display region of a screen.

The control for changing the sizes of the display regions R will now be described with reference to FIG. 14.

In step S21, the electronic controller 93 determines whether or not the presentation of the screen D1 including the display regions R is requested. For example, in a case in which power is supplied to the display device 90 or an operation for changing the presentation to the screen D1 from the screen D2 and the screen D3 is performed on the operating unit 66, the electronic controller 93 determines that the presentation of the screen D1 including the display regions R has been requested.

The electronic controller 93 repeats step S21 until the presentation of the display regions R is requested. If the electronic controller 93 determines that the presentation of the display regions R has been requested, then the electronic controller 93 specifies the type of each connected electronic device in step S22 and proceeds to step S23. The specifying of the type of the electronic device is performed in the same manner as the specifying of the type of the bicycle component 56 in step S11 of FIG. 6.

In step S23, the electronic controller 93 determines whether or not the sizes of the display regions R on the screen D1 need to be changed. More specifically, for each item stored in the memory device 94 in advance and configured to be shown on the screen D1, if information for showing the image P of the item cannot be obtained from any connected electronic device, then the electronic controller 93 deletes or reduces the size of the display region R that shows the corresponding image P and determines that the remaining display regions R need to be enlarged. In a case in which a connected electronic device adds an item to the items stored in the memory device 94 in advance and configured to be shown on the screen D1, the electronic controller 93 adds the display region R that shows the corresponding image P and determines that the remaining display regions R need to be reduced in size.

If the electronic controller 93 determines that the sizes of the display regions R need to be changed, then the electronic controller 93 changes the sizes of the display regions R based on the predetermined priority order in step S24. In step S25, the electronic controller 93 shows the screen D including the display regions R on the display 92. If the electronic controller 93 determines in step S23 that the sizes of the display regions R do not need to be changed, then the electronic controller 93 does not perform step S24 and proceeds to step S25 to show the screen D including the display regions R on the display 92.

Figure 15:
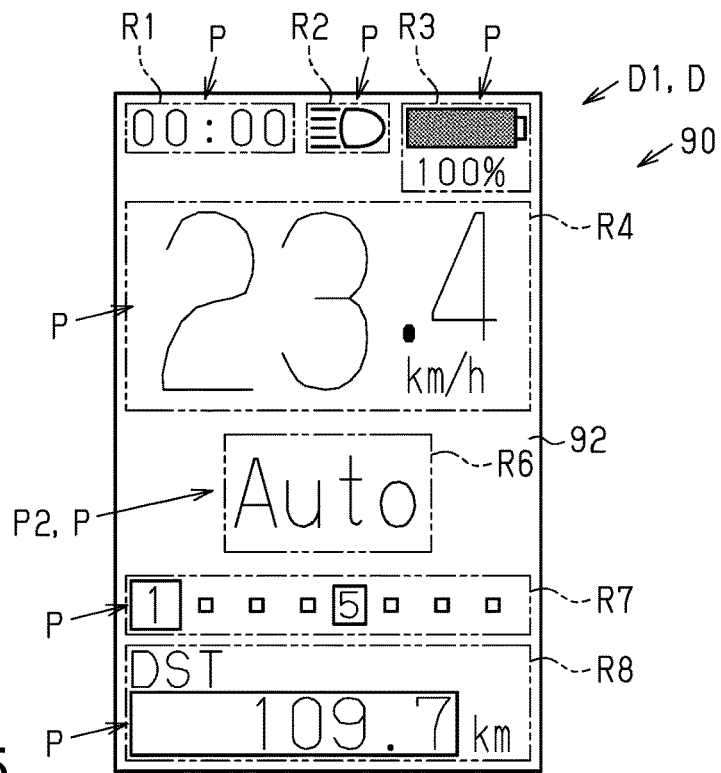
FIG. 15 is a diagram showing a ninth example shown on the screen of the bicycle display device of the second embodiment.

For example, in a case in which the bicycle electronic system 50 does not include the bicycle component 56, the display 92 deletes the fifth display region R5 from the screen D1 of FIG. 5 and enlarges the display region R having higher predetermined priority order. For example, in a case in which the memory device 94 stores information related to the priority shown in chart 3, if the fifth display region R5 is deleted, then the sixth display region R6, which has the highest priority next to the fifth display region R5, is enlarged as shown in FIG. 15.

CHART 3

| Enlargement Priority | Region |
| --- | --- |
| 1 | 5th Display Region |
| 2 | 6th Display Region |
| 3 | 7th Display Region |

Figure 16:
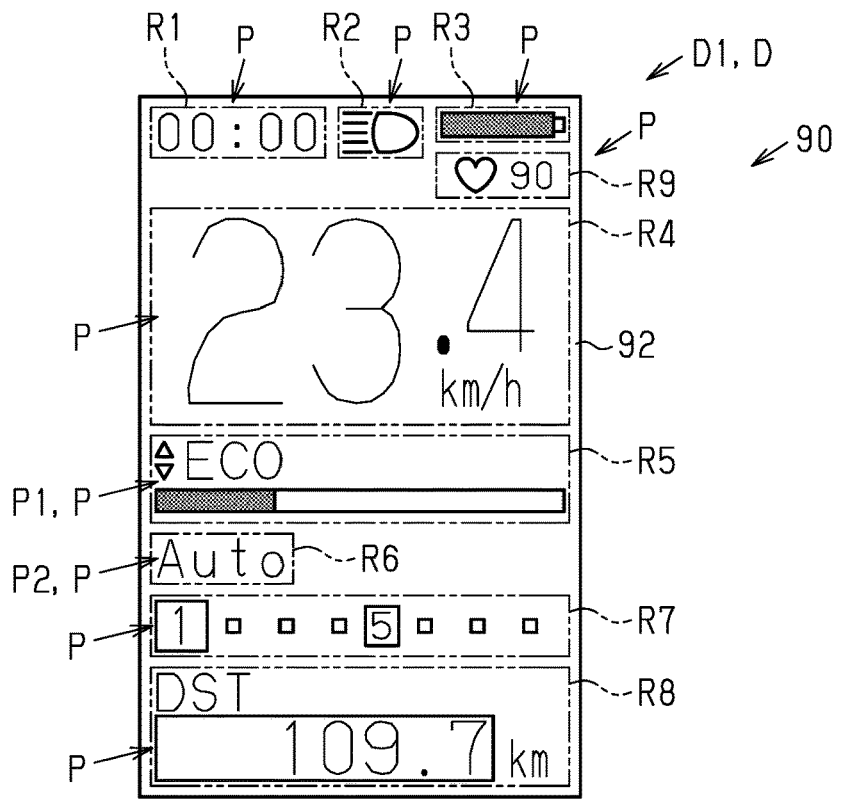
FIG. 16 is a diagram showing a tenth example shown on the screen of the bicycle display device of the second embodiment.

Additionally, for example, in a case in which the electronic devices of the bicycle electronic system 50 further include a sensor that detects the heart rate of the rider, a region R having lower predetermined priority order on the screen D is reduced in size. For example, in a case in which the memory device 94 stores information related to the priority shown in chart 4, the third display region R3 is reduced in size. Thus, as shown in FIG. 16, a ninth display region R9 is added to the margin to show the image P related to the heart rate.

CHART 4

| Miniaturization Priority | Region |
| --- | --- |
| 1 | 3th Display Region |
| 2 | 7th Display Region |
| 3 | 8th Display Region |

In a case in which the setting menu screen D2 shows an item that allows for a shift to a mode for changing the predetermined priority order and the item is selected, the electronic controller 93 can be configured to change information related to the predetermined priority order using the operating unit 66 or the operating unit 96. Alternatively, the electronic controller 93 can be configured to change the information related to the predetermined priority order in accordance with an instruction from an external device that is communicable with the communication unit 91.

Modifications

The above description illustrates embodiments of a bicycle display device according to the present invention and is not intended to be restrictive. The embodiments of the bicycle display device according to the present invention can be modified as follows. Further, two or more of the modifications can be combined. In the modifications, the same reference characters are given to those elements that are the same as the corresponding elements of the embodiments. Such elements will not be described in detail.

Figure 17:
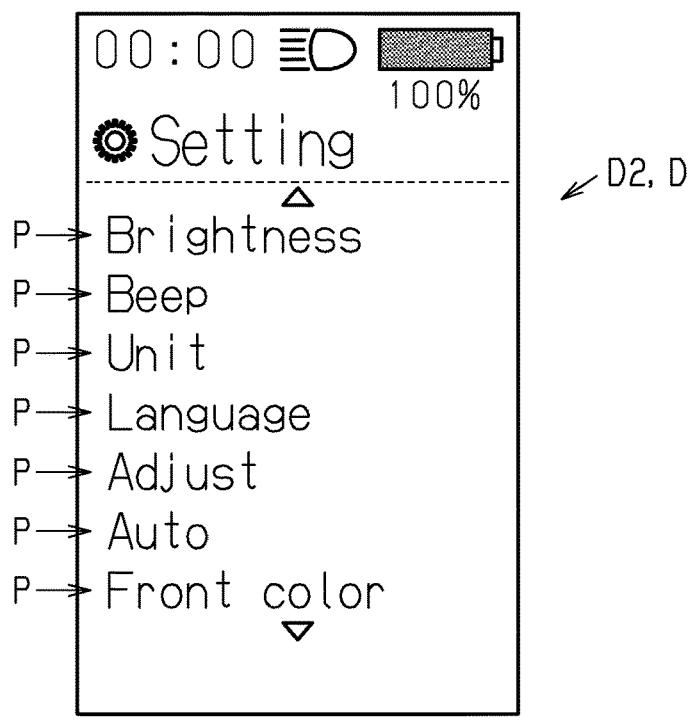
FIG. 17 is a diagram showing one example shown on the screen of a modification of a bicycle display device.

The electronic controller 93 can display the setting menu screen D2, which is partially changed in accordance with the type of the bicycle component 56 communicably connected to the communication unit 91, on the display 92. For example, in a case in which the bicycle electronic system 50 includes the first bicycle component 56A, the display 92 shows the setting menu screen D2 of FIG. 11. In a case in which the bicycle electronic system 50 includes the second bicycle component 56B, the bicycle electronic system 50 does not have the function for restoring the protection mechanism, which conforms the position of the movable portion of the first shifting apparatus 58A obtained based on the detection result of the shifting state detection device 89A to the actual position. Thus, as shown in FIG. 17, the display 92 shows the setting menu screen D2 that omits the item for executing the function for restoring the protection mechanism, which conforms the position of the movable portion of the first shifting apparatus 58A obtained based on the detection result of the shifting state detection device 89A to the actual position.

The bicycle component 56 of the first embodiment can include at least one of the shifting apparatus 58, a suspension, and an adjustable seatpost. The display device 90 is applicable to any bicycle component as long as the bicycle component is operable in multiple modes.

Figure 18:
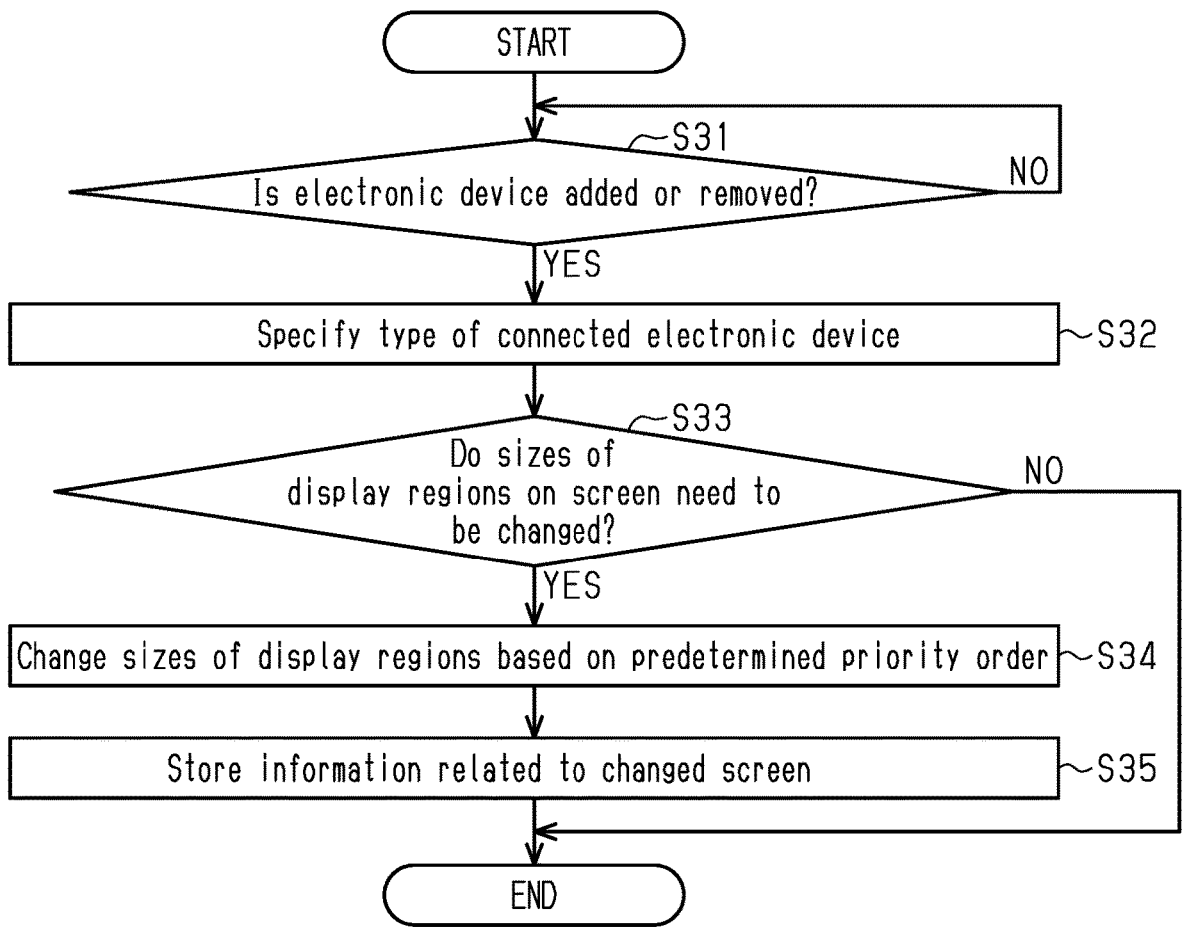
FIG. 18 is a flowchart of control performed by the bicycle display device of the modification of the second embodiment for changing a display region of a screen.

The electronic controller 93 of the second embodiment can be configured to change information related to the screen D1 including the display regions R and stored in the memory device 94. For example, if an electronic device is added or removed, then the information related to the display regions R of the screen D1 and stored in the memory device 94 is changed. Subsequently, the screen D1 is shown based on the information stored in the memory device 94. In this case, as shown in FIG. 18, in step S31, the electronic controller 93 determines whether or not an electronic device is added to or removed from the bicycle electronic system 50. The electronic controller 93 can obtain information of the electronic devices included in the bicycle electronic system 50 in predetermined cycles. Alternatively, the electronic controller 93 can determine whether or not an electronic device is added to or removed from the bicycle electronic system 50 based on information of the addition and removal of an electronic device transmitted from an external device. In a case in which the electronic controller 93 determines the addition or removal of an electronic device, the electronic controller 93 specifies the type of the connected electronic devices in step S32 and proceeds to step S33. The electronic controller 93 determines whether or not the sizes of the display regions R on the screen D1 need to be changed based on the information of the connected electronic devices. If the electronic controller 93 determines that the sizes of the display regions R do not need to be changed, then the electronic controller 93 ends the process. If the electronic controller 93 determines that the sizes of the display regions R need to be changed, then the electronic controller 93 proceeds to step S34 and changes the sizes of the display regions R based on the predetermined priority order. The electronic controller 93 stores the information related to the changed screen D1 in the memory device 94 in step S35 and ends the process.

The operating device 53 can be configured to be integrated with the display device 90 or other devices of the bicycle electronic system 50. If the memory device 94 is omitted from the display device 90, then the memory devices 78A, 78B of the bicycle components 56 can store the contents shown on the display 92. The bicycle component 56 transmits information that is shown on the display 92 to the display device 90 in accordance with an operation of the operating device 53. The display device 90 shows the image P on the display 92 based on the information transmitted from the bicycle component 56.

The display device 90 can include a smartphone or a tablet PC. Additionally, the display device 90 can be configured to be carried by the rider. The operating unit 96 can be omitted from the display device 90. In this case, the operating unit that starts the supply of power to the display device 90 can be provided on another device of the bicycle electronic system 50. Additionally, the activation and deactivation states of the display device 90 can be configured to be synchronized with the activation and deactivation states of other devices of the bicycle electronic system 50.

In the bicycle electronic system 50, at least one of the battery unit 52, the operating device 53, the lamp 54, the vehicle speed sensor 55, the bicycle component 56, the shifting apparatus 58, and the bicycle display device 90 can be connected to the electronic controller 76B of the bicycle component 56 by at least one of a power line that transmits only power and a communication line that transmits only communication signals instead of through the power line communication.

What is claimed is:

1. A bicycle display device configured to be mounted on a bicycle, the bicycle display device comprising:
    a communication unit communicably connected to a bicycle component that is mounted on the bicycle and configured to be actuated in multiple actuation modes, the bicycle component including a motor arranged to assist propulsion of the bicycle by transmitting rotation to a front wheel of the bicycle or to a power transmission path extending from pedals of the bicycle to a rear wheel of the bicycle, an output state of the motor being different in each of a plurality of assist modes among the multiple actuation modes of the bicycle component, the bicycle component being one of a plurality of types of bicycle component that are different from one another and configured to be selectively connected to the bicycle display device;
    a display configured to show an image related to the assist modes of the bicycle component; and
    an electronic controller configured to identify the type of the bicycle component communicably connected to the communication unit and change the image shown on the display in accordance with the type of the bicycle component.

2. The bicycle display device according to claim 1, wherein
    the types of the bicycle components include a first bicycle component and a second bicycle component, the first bicycle component and the second bicycle component being replaceable with respect to each other,
    the electronic controller is configured to set the image shown on the display to correspond to the actuation modes of the first bicycle component upon determining the communication unit is communicably connected to the first bicycle component and communicably disconnected from the second bicycle component, and
    the electronic controller is configured to set the image shown on the display to correspond to the actuation modes of the second bicycle component on the display upon determining the communication unit is communicably connected to the second bicycle component and communicably disconnected from the first bicycle component.

3. The bicycle display device according to claim 2, wherein
    the first bicycle component is configured to control a first shifting device of the bicycle,
    the second bicycle component is configured to control a second shifting device of the bicycle,
    the multiple actuation modes of the first bicycle component include a mode in which a setting of the first shifting device is changeable and a mode in which the first shifting device performs a shifting action in accordance with an operation of an operating device, and
    the multiple actuation modes of the second bicycle component include a mode in which a setting of the second shifting device is changeable and a mode in which the second shifting device performs a shifting action in accordance with an operation of the operating device.

4. The bicycle display device according to claim 1, further comprising
    a memory device that stores information used to show the image on the display.

5. The bicycle display device according to claim 1, wherein
    the communication unit includes at least one of a communication port communicable with the bicycle component through wire connection and a wireless communication module communicable with the bicycle component through wireless connection.

6. The bicycle display device according to claim 1, wherein
    the image includes a character.

7. The bicycle display device according to claim 1, wherein
    the image includes an icon.

8. The bicycle display device according to claim 1, wherein
    the bicycle component is configured to control a shifting device of the bicycle,
    the multiple actuation modes of the bicycle component include a mode in which a setting of the shifting device is changeable and a mode in which the shifting device performs a shifting action in accordance with an operation of an operating device.

9. A bicycle display device configured to be mounted on a bicycle, the bicycle display device comprising:
    a communication unit communicably connected to a bicycle component that is mounted on the bicycle, the bicycle component being one of a plurality of types of bicycle component that are different from one another and configured to be selectively connected to the bicycle display device, the bicycle component being configured to control a shifting device of the bicycle;
    a display configured to show a setting menu screen that contains a plurality of images related to items settable in correspondence with the bicycle component, the images including characters indicating an adjustment position of a movable portion of the shifting device; and
    an electronic controller configured to identify the type of the bicycle component communicably connected to the communication unit and to change a portion of the setting menu screen in accordance with the type of the bicycle component, the changed portion including the characters indicating the adjustment position of the shifting device.

10. The bicycle display device according to claim 9, wherein
    the electronic controller is configured to control the display so as not to show an image related to an item that is not settable for the type of bicycle component communicably connected to the communication unit.

11. The bicycle display device according to claim 10, wherein
    the items are related to an action of the shifting device.

12. The bicycle display device according to claim 11, wherein
    the items are related to a process for controlling the shifting device to change a transmission ratio of the bicycle.

13. The bicycle display device according to claim 9, wherein
the characters indicate the adjustment position of the movable portion in a stepped manner.

14. A bicycle display device configured to be mounted on a bicycle, the bicycle display device comprising:
a communication unit communicably connected to an electronic device that is mounted on the bicycle or carried by a rider of the bicycle, the electronic device being one of a plurality of types of electronic device that are different from one another and configured to be selectively connected to the bicycle display device;
a display configured to show a plurality of images related to the electronic device, each of the plurality of images being shown in each of a plurality of display regions contained in one screen, the display regions corresponding to menu items stored in advance; and
an electronic controller configured to identify the type of the electronic device communicably connected to the communication unit and determine whether to add or delete a display region in accordance with the type of the electronic device communicably connected to the communication unit, the electronic controller being further configured to change a size of at least one of the plurality of display regions when a display region is added or deleted, wherein
each of the images displayed in the plurality of display regions is related to one of a speed of the bicycle, a battery level, time, a state of a lamp, an actuation mode of the bicycle component, and cadence.

15. The bicycle display device according to claim 14, wherein
the electronic device includes at least one of a bicycle component mounted on the bicycle and a sensor carried by the rider.

16. The bicycle display device according to claim 15, wherein
the display is further configured to show an image related to at least one of a heart rate and a blood pressure in at least one of the plurality of display regions.

17. The bicycle display device according to claim 14, wherein
the electronic controller is configured to change sizes of the display regions in accordance with a predetermined priority order given to the images related to the electronic device.

18. The bicycle display device according to claim 17, wherein
the electronic controller is configured to change the predetermined priority order.

* * * * *